United States Patent
Arnott et al.

(10) Patent No.: US 9,516,511 B2
(45) Date of Patent: Dec. 6, 2016

(54) COMMUNICATION SYSTEM

(71) Applicant: NEC Corporation, Minato-ku, Tokyo (JP)

(72) Inventors: Robert Arnott, London (GB); Tao Guo, Woking (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/762,991

(22) PCT Filed: Apr. 4, 2014

(86) PCT No.: PCT/JP2014/060446
§ 371 (c)(1),
(2) Date: Jul. 23, 2015

(87) PCT Pub. No.: WO2014/168225
PCT Pub. Date: Oct. 16, 2014

(65) Prior Publication Data
US 2015/0358829 A1     Dec. 10, 2015

(30) Foreign Application Priority Data

Apr. 10, 2013   (GB) ................................. 1306539.6

(51) Int. Cl.
| | |
|---|---|
| *H04W 72/00* | (2009.01) |
| *H04W 16/14* | (2009.01) |
| *H04W 72/12* | (2009.01) |
| *H04L 12/46* | (2006.01) |

(Continued)

(52) U.S. Cl.
CPC .......... *H04W 16/14* (2013.01); *H04L 12/4641* (2013.01); *H04W 72/06* (2013.01); *H04W 72/12* (2013.01); *H04W 88/10* (2013.01)

(58) Field of Classification Search
CPC ... H04W 72/06; H04W 16/14; H04W 88/10; H04W 72/12; H04L 12/4641; G06Q 10/06; G06Q 10/06315; G06Q 10/101; G06F 9/5072
USPC ........................................... 455/454
See application file for complete search history.

(56) References Cited

U.S. PATENT DOCUMENTS

| | | | |
|---|---|---|---|
| 5,745,837 A | 4/1998 | Fuhrmann | |
| 2005/0198102 A1* | 9/2005 | Hahn | G06F 9/44505 709/200 |
| 2008/0075109 A1* | 3/2008 | Zangi | H04W 72/06 370/458 |

(Continued)

FOREIGN PATENT DOCUMENTS

| | | |
|---|---|---|
| EP | 1796305 A2 | 6/2007 |
| EP | 2151954 A1 | 2/2010 |

(Continued)

OTHER PUBLICATIONS

International Search Report for PCT Application No. PCT/JP2014/060446, mailed on Dec. 4, 2014.

*Primary Examiner* — Mahendra Patel

(57) ABSTRACT

A wireless telecommunication system is described comprising a shared base station able to divide resources between multiple network operators sharing the base station. The base station resources are divided into resource pools having their own set of sharing rules and associated scheduling method that may be configured independently for each resource pool. A number of techniques are described that may be used to ensure flexibility and fairness of access to the base station resources for the multiple network operators.

24 Claims, 9 Drawing Sheets

(51) Int. Cl.
*H04W 72/06* (2009.01)
*H04W 88/10* (2009.01)

(56) References Cited

U.S. PATENT DOCUMENTS

| | | | | |
|---|---|---|---|---|
| 2008/0271039 | A1* | 10/2008 | Rolia | G06Q 10/06 718/105 |
| 2009/0154415 | A1 | 6/2009 | Park et al. | |
| 2009/0210875 | A1* | 8/2009 | Bolles | G06F 3/0608 718/1 |
| 2009/0276771 | A1* | 11/2009 | Nickolov | G06F 9/4856 717/177 |
| 2010/0082922 | A1* | 4/2010 | George | G06F 9/461 711/162 |
| 2011/0216721 | A1* | 9/2011 | Min | H04W 72/04 370/329 |
| 2012/0051296 | A1* | 3/2012 | Kokku | H04W 28/26 370/329 |
| 2012/0096167 | A1* | 4/2012 | Free | G06F 9/5011 709/226 |
| 2012/0290348 | A1* | 11/2012 | Hackett | G06Q 10/06 705/7.13 |

FOREIGN PATENT DOCUMENTS

| | | |
|---|---|---|
| EP | 2237630 A2 | 10/2010 |
| EP | 2493235 A1 | 8/2012 |
| EP | 2627140 A1 | 8/2013 |
| GB | 2490968 A | 11/2012 |
| WO | 2007/024748 A2 | 3/2007 |
| WO | 2010/111839 A1 | 10/2010 |

* cited by examiner

COMMUNICATION SYSTEM

TECHNICAL FIELD

The present invention relates to a radio access network in a cellular or wireless telecommunications network, and particularly but not exclusively to sharing the radio access network between multiple operators. The invention has particular but not exclusive relevance to wireless telecommunications networks implemented according to the Long Term Evolution (LTE) standard.

BACKGROUND ART

Radio Access Network (RAN) sharing deployment scenarios are known and methods and abilities to facilitate implementations of these scenarios have been introduced into the $3^{rd}$ Generation Partnership Project (3GPP) standards since Release 5.

RAN sharing provides a way for network operators (service providers) to reduce their capital expenditure requirements and/or widen the area covered by a cellular communication service when setting up a wireless communications network. Rather than each operator having to provide their own base station and associated equipment for each cell of the network, an operator sharing the RAN of another operator is able to provide their service into areas served by the other operator without having to invest in their own base stations in that location.

Furthermore, by reducing the number of base stations that must be provided and operated, the on-going operating costs can be reduced for the sharing operators. Indeed, each base station may draw a large amount of electricity during operation, and therefore reducing the number of operating base stations may significantly reduce electrical power requirements and may therefore also be considered environmentally friendly.

Typically, sharing of RANs by operators has been a symmetric arrangement in which each operator gets some access to the RAN of the other operator. In the extreme, such an arrangement allows two operators to provide service to the same area with half as many base stations (and therefore with significantly reduced cost) as would be required if no sharing was possible.

RAN sharing is particularly advantageous in areas in which an operator has cell capacity that is underused, as this spare capacity can then be shared with no impact on the original operator's on-going service provision. Furthermore, RAN sharing may be useful in order to ensure that a service provided by an operator is able to reach a certain percentage of the population, which may be specified by license conditions in some countries, without requiring each operator to install expensive capacity in remote areas in which it is likely to be underutilized.

Currently, the standards relating to RAN sharing are limited to two scenarios. In a first scenario, only the RAN base stations themselves are shared by the different operators. In a second scenario, parts of the core network, for example the Evolved Packet Core (EPC) in LTE, can be shared as well as the RAN base stations, further decreasing capital expenditure costs in setting up the network. In each case, sharing of the RAN can be arranged to use split frequencies, in which each operator sharing the RAN has allocated (different) frequency ranges, or may use common frequencies in which the full range of frequencies is available for use by either operator.

The mechanisms for sharing of RANs may also be useful in the case of mergers of operator companies, allowing the two operators to merge their network services without any significant interruptions in service provision.

The recent economic situation has provided further impetus for network operators to reduce costs, and therefore increased the trend to share networks with other operators. However, this trend combined with the uptake of mobile data services resulted in a significant increase in the overall system load without a corresponding increase in capacity.

It is therefore an object of the present invention to improve performance of the communication networks that support RAN sharing.

DISCLOSURE OF THE INVENTION

In one aspect, the present invention provides a base station for sharing resources of a communication bandwidth between a plurality of network operators, the base station comprising means for defining: (a) a first proportion of said resources of said communication bandwidth, said first proportion representing a first virtual pool of resources; (b) a second proportion of said resources of said communication bandwidth, said second proportion representing a second virtual pool of resources; (c) for said first virtual resource pool: a respective first pool proportion, for each network operator, representing a reserved proportion of the resources of the first virtual pool to be allocated for a set of one or more communication bearers for that network operator; and (d) for said second virtual resource pool: a respective second pool proportion, for each network operator, representing a reserved proportion of the resources of the second virtual pool to be allocated for the set of one or more communication bearers for that network operator. The base station comprises means for prioritising allocation of resources to the respective set of one or more communication bearers for each network operator in dependence on an analysis based on the pool proportion of that network operator in at least one of said virtual resource pools. The base station also comprises means for allocating resources, in a current scheduling round, to the communication bearers of each network operator in dependence on a scheduling priority attributed to the communication bearers of that network operator by the prioritising means.

The prioritising means may be operable to exclude the set of one or more communication bearers for at least one network operator from resource allocation, in the current scheduling round, in dependence on said analysis. In this case, the prioritising means may be operable to exclude the respective set of one or more communication bearers for said at least one network operator from resource allocation by causing the allocating means to ignore the set of one or more communication bearers for that at least one network operator during scheduling.

The prioritising means may be operable to exclude the respective set of one or more communication bearers for said at least one network operator from resource allocation by omitting said set of one or more communication bearers for that at least one network operator from a prioritised list of sets of communication bearers.

The prioritising means may be operable to exclude the respective set of one or more communication bearers for said at least one network operator from resource allocation by attributing a minimum (or 'zero') priority to said set of one or more communication bearers for that at least one network operator.

The prioritising means may be operable to exclude the set of one or more communication bearers for said at least one network operator from resource allocation when said analysis indicates that a measure of resource usage by that set of one or more communication bearers exceeds a sum of all pool proportions for that network operator across all virtual resource pools. The prioritising means may be operable to exclude the set of one or more communication bearers for said at least one network operator from resource allocation when a condition represented by the following inequality is met:

$$t_{g,j}^{exp} > \sum_{m=0}^{M-1} t_{m,g,j}^{pool}$$

where $t_{g,j}^{exp}$ is the measure of resource usage by a set of one or more communication bearers for a network operator denoted 'g' as measured for sub-frame denoted 'j'; M is the number of pool virtual resource pools; $t_{m,g,j}^{pool}$ is the proportion of resources that an operator proportion for a set of one or more communication bearers for a network operator denoted 'g' can obtain in a virtual resource pool denoted 'm' in a sub-frame denoted 'j'.

The proportion of the resources that a particular network operator can obtain, $t_{m,g,j}^{pool}$, may be represented by the following formula:

$$Q \frac{f_g t_{m,g}^{rsv}}{\sum_k f_k t_{m,k}^{rsv}}$$

where $t_{m,g}^{rsv}$ is the size of a pool proportion, in the range of 0 to 1, for a set of one or more communication bearers for a network operator denoted 'g' in a resource pool denoted 'm'; $f_g$ is a Boolean operator which is set to 1, for a virtual resource pool, for the set of one or more communication bearers for a network operator denoted 'g' if that network operator is allowed to use that particular pool, and set to 0, for a virtual resource pool, for the set of one or more communication bearers for a network operator denoted 'g' if that network operator is not allowed to use that particular pool; Q is a quantity of remaining resources that can be distributed, in that particular resource pool, amongst communication bearers of all network operators that are allowed to use that particular resource pool, and wherein when analysing each virtual resource pool, Q is initially set to the size of that particular resource pool.

The measure of resource usage may represent resource usage over a predetermined number of sub-frames. The measure of resource usage may represent resource usage by that set of one or more communication bearers over all resource pools.

The prioritising means may be operable, when analysing each virtual resource pool, to attribute a higher scheduling priority to the set of one or more communication bearers for a first network operator than to the set of one or more communication bearers for a second network operator when a predetermined condition is fulfilled based on a comparison of a respective measure of resource usage for the set of one or more communication bearers for each of the first and second network operator. In this case, the condition may be fulfilled when the pool proportion for the first network operator, in the virtual resource pool being analysed, is not less than the measure of resource usage for the set of one or more communication bearers for the first network operator and the pool proportion for the second network operator, in the virtual resource pool being analysed, is less than the measure of resource usage for the set of one or more communication bearers for the second network operator. For example, the condition may be fulfilled when:

$$t_{m,g,j}^{pool} \geq t_g^{req}$$

where $t_{m,g,j}^{pool}$ is the amount of resources that a set of one or more communication bearers for the set of one or more communication bearers for a network operator denoted 'g' can obtain in the virtual resource pool denoted 'm' being analysed in a sub-frame denoted 'j'; $t_g^{req}$ is the measure of resource usage for the set of one or more communication bearers for the set of one or more communication bearers for a network operator denoted 'g', in the range of 0 to 1.

When the respective set of one or more communication bearers for each of a plurality of network operators fulfils said condition, the prioritising means may be operable to attribute a scheduling priority to the respective set of one or more communication bearers for each of the plurality of network operators fulfilling said condition in descending order of a ratio of the respective pool proportion for that network operator, in the virtual resource pool being analysed, to the measure of resource usage for the set of one or more communication bearers for that network operator.

When the respective set of one or more communication bearers for each of a plurality of network operators fulfils said condition, said prioritising means may be operable to attribute a scheduling priority to the respective set of one or more communication bearers for each of the plurality of network operators fulfilling said condition in descending order of the following ratio:

$$\frac{t_{m,g,j}^{rsv}}{t_g^{req}}$$

where $t_{m,g,j}^{rsv}$ is the size of a pool proportion, in the range of 0 to 1, for a set of one or more communication bearers for a network operator denoted 'g', in the virtual resource pool denoted 'm' being analysed in a sub-frame denoted 'j'; and $t_g^{req}$ is the measure of resource usage for the set of one or more communication bearers for the network operator denoted 'g', in the range of 0 to 1.

The respective measure of resource usage for the set of one or more communication bearers for each of the first and second network operator may represent usage over a predetermined number of sub-frames.

The respective measure of resource usage for the set of one or more communication bearers for each of the first and second network operator may represent usage by that set of one or more communication bearers over all resource pools.

The measure of resource usage by the communication bearers of a particular network operator may be based on the resources assigned to communication bearers of that network operator in a current sub-frame. The measure of resource usage by the communication bearers of a particular network operator may also be based on the resources assigned to communication bearers of that network operator in at least one previous sub-frame.

The means for allocating resources may be operable to allocate a respective operator specific predetermined amount of resources, in said current scheduling round, to the set of one or more communication bearers of each network operator, regardless of whether or not said prioritising means has excluded the respective set of one or more communication bearers for that particular network operator from resource allocation.

In this case, each respective operator specific predetermined minimum amount of resources may be defined as a fraction of the resources in the communication bandwidth and which is smaller than or equal to the sum of all pool proportions for that particular network operator.

For example, each respective operator specific predetermined minimum amount of resources may be reserved for delay-sensitive communication bearers, if said prioritising means has excluded the respective set of one or more communication bearers for that particular network operator from resource allocation.

The prioritising means may be operable to select said at least one virtual resource pool for which to perform said analysis. For example, the prioritising means may be operable to select each said virtual resource pool for which to perform said analysis in turn in a round-robin manner.

The prioritising means may be operable to select said at least one virtual resource pool for which to perform said analysis based on a pool weight determined for said pool in said current scheduling round compared to a respective pool weight determined for each other virtual resource pool in said current scheduling round.

The weight for each pool may be given by a ratio of the proportion of said resources of said communication bandwidth representing that virtual resource pool to a measured resource usage, for all sets of communication bearers, in that virtual resource pool. In this case, the respective pool weights for each virtual resource pool may be represented by the following equation:

$$\omega_{m,j} = \frac{P_m}{\tau_{m,j}^{exp}}$$

where $\omega_{m,j}$ is the pool weight for communication bearers of a virtual resource pool denoted 'm' in a sub-frame denoted 'j'; $P_m$ is the proportion of said resources of said communication bandwidth representing the virtual resource pool denoted 'm'; and $\tau_{m,j}^{exp}$ is the measure of resource usage by the proportion of said resources of said communication bandwidth representing the virtual resource pool denoted 'm' as measured for the sub-frame denoted 'j'.

The communication bandwidth representing the virtual resource pool denoted 'm' as measured for the sub-frame denoted 'j' may be represented by the following equation:
i) for a virtual resource pool denoted 'm' that has been selected by said prioritising means in a sub-frame immediately preceding the sub-frame denoted 'j':

$$\tau_{m,j}^{exp} = (1-\beta)\tau_{m,j-1}^{exp} + \beta; \text{and}$$

ii) for a virtual resource pool denoted 'm' that has not been selected by said prioritising means in the sub-frame immediately preceding the sub-frame denoted 'j':

$$\tau_{m,j}^{exp} = (1-\beta)\tau_{m,j-1}^{exp}$$

where $\tau_{m,j}^{exp}$ is the measure of resource usage by the proportion of said resources of said communication bandwidth representing the virtual resource pool denoted 'm' as measured for sub-frame denoted 'j'; and $\beta$ is a forgetting factor parameter in the range 0 to 1.

The prioritising means may be operable to prioritise allocation of resources to the respective set of one or more communication bearers for each network operator allowed to use said selected at least one virtual resource pool based on a slice weight determined for that set of one or more communication bearers for that network operator.

The slice weight for the respective set of one or more communication bearers for each network operator allowed to use said selected at least one virtual resource pool may be given by a ratio of the respective pool proportion, in that virtual resource pool, for that network operator and the measure of resource usage, in that virtual resource pool, for the set of one or more communication bearers for that network operator. In this case, the slice weight for the respective set of one or more communication bearers for each network operator allowed to use said selected at least one virtual resource pool may be represented by the following equation:

$$w_{m,g,j} = \frac{t_{m,g}^{rsv}}{t_{m,g,j}^{exp}}$$

where $w_{m,g,j}$ is the weight, calculated in a sub-frame denoted 'j', for communication using the respective set of one or more communication bearers for a network operator denoted 'g' allowed to use the virtual resource pool denoted 'm'; $t_{m,g}^{rsv}$ is the respective pool proportion, in the range of 0 to 1, for the set of one or more communication bearers for a network operator denoted 'g' representing a reserved proportion of the resources of the virtual pool denoted 'm', and $t_{m,g,j}^{exp}$ is the measure of resource usage for the set of one or more communication bearers for the network operator denoted 'g' as measured for the sub-frame denoted 'j' in the resource pool denoted 'm'.

The measure of resource usage by the set of one or more communication bearers for a network operator denoted 'g' as measured for sub-frame denoted 'j' may be represented by the following equations:
i) in a virtual resource pool denoted 'm' that has been selected by said prioritising means in a sub-frame immediately preceding the sub-frame denoted 'j':

$$t_{m,g,j}^{exp} = (1-\beta)t_{m,g,j-1}^{exp} + \beta\frac{N_{g,j-1}}{K};$$

and ii) in a virtual resource pool denoted 'm' that has not been selected by said prioritising means in the sub-frame immediately preceding the sub-frame denoted 'j':

$$t_{m,g,j}^{exp} = (1-\beta)t_{m,g,j-1}^{exp};$$

where $t_{m,g,j}^{exp}$ is the measure of resource usage for the set of one or more communication bearers for the network operator denoted 'g' as measured for the sub-frame denoted 'j' in the resource pool denoted 'm', $N_{g,j-1}$ is the total number of resources assigned in a sub-frame immediately preceding sub-frame denoted 'j'; K is the number of resources in the communication bandwidth; and $\beta$ is a forgetting factor parameter in the range 0 to 1.

The sum of all pool proportions defined in all virtual resource pools may equal to the total shared resources via said base station, and may be represented by the following equation:

$$\sum_{m=0}^{M-1} P_m = 1$$

where $P_m$ is the proportion of said resources of said communication bandwidth representing the virtual resource pool denoted 'm', in the range 0 to 1; and M is the number of virtual resource pools.

In another aspect, the invention provides a base station for sharing resources of a communication bandwidth between a plurality of network operators, the base station comprising: means for defining, for each network operator, a respective share of resources that would be allocated for a set of one or more communication bearers for that network operator if said communication bandwidth were in a congested state; means for prioritising allocation of resources to the respective set of one or more communication bearers for each network operator in dependence on said defined respective share of resources for that network operator; and means for allocating resources, in a current scheduling round, to the communication bearers of each network operator in dependence on a scheduling priority attributed to the communication bearers of that network operator by the prioritising means.

The base station may further comprise means for determining, prior to said scheduling, a measure of an amount of resources that would remain unused if scheduling were based on said prioritisation alone and for defining a distribution of said amount of resources that would remain unused, to the communication bearers of at least one other network operator, in dependence on said respective share of resources for that network operator.

The prioritising means may be operable to exclude the set of one or more communication bearers for at least one network operator from resource allocation, in the current scheduling round, in dependence on said respective share of resources for that network operator.

The prioritising means may be operable to prioritise said allocation of resources in dependence on a respective weight determined for said set of one or more communication bearers of each network operator in said current scheduling round. For example, the weight for a set of one or more communication bearers of a particular network operator may be given by a ratio of the respective share of resources to a measured resource usage, for that set of communication bearers. In this case, the respective weights for each set of one or more communication bearers may be represented by the following equation:

$$w_g = \frac{t_g^{share}}{t_g^{exp}}$$

where $w_g$ is the weight for set of one or more communication bearers of a network operator denoted 'g'; $t_g^{share}$ is the share of resources for the set of one or more communication bearers of the network operator denoted 'g'; and $t_g^{exp}$ is the measure of resource usage by the set of one or more communication bearers of the network operator denoted 'g'.

The respective share of resources that would be allocated for a set of one or more communication bearers for each network operator if said communication bandwidth were in a congested state may be dependent on i) a respective reserved proportion of the resources of the communication bandwidth for the set of one or more communication bearers for that network operator and ii) a measure of usage of the resources of the communication bandwidth for the set of one or more communication bearers for that network operator.

In yet another aspect, the invention provides a base station for sharing resources of a communication bandwidth between a plurality of network operators, the base station comprising: means for defining a respective proportion, for each network operator, representing a reserved proportion of the resources of said communication bandwidth to be allocated for a set of one or more communication bearers for that network operator; means for prioritising allocation of resources to the respective set of one or more communication bearers for each network operator in dependence on an analysis based on the proportion of that network operator, wherein said prioritising means is operable to exclude the set of one or more communication bearers for at least one network operator from resource allocation, in the current scheduling round, in dependence on said analysis; and means for allocating resources, in a current scheduling round, to the communication bearers of each network operator in dependence on a scheduling priority attributed to the communication bearers of that network operator by the prioritising means.

The invention also provides a base station for sharing resources of a communication bandwidth between a plurality of network operators, the base station comprising means for defining: (a) a first operator proportion representing a reserved proportion of the resources to be allocated for a first set of one or more communication bearers for a first network operator; and (b) a second operator proportion representing a reserved proportion of the resources to be allocated for a second set of one or more communication bearers for a second network operator. The base station also comprises means for prioritising allocation of resources to the respective set of one or more communication bearers for each network operator in dependence on an analysis based on the operator proportion of that network operator; means for allocating resources, in a current scheduling round, to the respective communication bearers of each network operator in dependence on a scheduling priority attributed to the communication bearers of that network operator by the prioritising means. The allocating means is operable: to allocate, to each communication bearer of a first group of communication bearers a respective predetermined amount of resources, in a priority order based on the scheduling priority attributed to the network operator to which each communication bearer of said first group of communication bearers belongs; and then to allocate, to each communication bearer of a second group of communication bearers, resources remaining after said allocation to each communication bearer of said first group of communication bearers, in a priority order based on the scheduling priority attributed to the network operator to which each communication bearer of said second group of communication bearers belongs.

In this case, each communication bearer of said first group of communication bearers may be characterised as a delay-sensitive communication bearer (e.g. for a real-time (RT), Voice over IP (VoIP), guaranteed bit-rate (GBR), minimum quality of service (QoS), service and/or the like). The second group of communication bearers may comprise at least one delay-tolerant communication bearer (e.g. for a non-real-time (NRT), file transfer protocol (FTP), and/or the like).

The respective predetermined amount of resources that said allocating means is operable to allocate to each communication bearer of said first group of communication bearers may be dependent on the operator proportion for the network operator to which that communication bearer belongs.

The respective predetermined amount of resources that said allocating means is operable to allocate to each communication bearer of said first group of communication bearers may be defined as a fraction of the resources in the communication bandwidth and does not exceed the operator proportion for the network operator to which that communication bearer belongs.

The respective predetermined amount of resources that said allocating means is operable to allocate to each communication bearer of said first group of communication bearers may be represented by the following equation:

$$K_{g,j}^{S1} = K \cdot t_g^{inst}$$

where $K_{g,j}^{S1}$ s a predetermined amount of resources that is allocated to each communication bearer of said first group of communication bearers from the set of one or more communication bearers for a network operator denoted 'g' in a sub-frame denoted 'j'; $t_g^{inst}$ is a ratio, in the range of 0 to 1, of instantaneous resource guarantee for the set of one or more communication bearers for the network operator denoted 'g' in each sub-frame; and K is the number of resources in the communication bandwidth.

The respective predetermined amount of resources that said allocating means is operable to allocate to each communication bearer of said first group of communication bearers may be represented by the following equation:

$$K_{g,j}^{S1} = \lfloor K \cdot t_g^{inst} \rfloor$$

where $K_{g,j}^{S1}$ is a predetermined amount of resources that is allocated to each communication bearer of said first group of communication bearers from the set of one or more communication bearers for a network operator denoted 'g' in a sub frame denoted 'j'; $t_g^{inst}$ is a ratio, in the range of 0 to 1, of instantaneous resource guarantee for the set of one or more communication bearers for the network operator denoted 'g' in each sub-frame; K is the number of resources in the communication bandwidth; and $\lfloor \ \rfloor$ is a floor function.

In this case, when, for a particular communication bearer of said first group, there is a difference between $K \cdot t_g^{inst}$ and the largest integer number not greater than $K \cdot t_g^{inst}$ arising from the use of the floor function, said allocating means may be operable to accumulate the amount of resources represented by the difference for addition to the respective predetermined amount of resources that said allocating means is operable to allocate to that communication bearer of said first group in a subsequent scheduling round.

The invention also provides a base station for sharing resources of a communication bandwidth between a plurality of network operators, the base station comprising a processor configured to define: (a) a first proportion of said resources of said communication bandwidth, said first proportion representing a first virtual pool of resources; (b) a second proportion of said resources of said communication bandwidth, said second proportion representing a second virtual pool of resources; (c) for said first virtual resource pool: a respective first pool proportion, for each network operator, representing a reserved proportion of the resources of the first virtual pool to be allocated for a set of one or more communication bearers for that network operator; and (d) for said second virtual resource pool: a respective second pool proportion, for each network operator, representing a reserved proportion of the resources of the second virtual pool to be allocated for the set of one or more communication bearers for that network operator. The processor is configured to prioritise allocation of resources to the respective set of one or more communication bearers for each network operator in dependence on an analysis based on the pool proportion of that network operator in at least one of said virtual resource pools; and allocate resources, in a current scheduling round, to the communication bearers of each network operator in dependence on a scheduling priority attributed to the communication bearers of that network operator by the prioritising.

The invention also provides a base station for sharing resources of a communication bandwidth between a plurality of network operators, the base station comprising a processor configured to: define, for each network operator, a respective share of resources that would be allocated for a set of one or more communication bearers for that network operator if said communication bandwidth were in a congested state; prioritise allocation of resources to the respective set of one or more communication bearers for each network operator in dependence on said defined respective share of resources for that network operator; and allocate resources, in a current scheduling round, to the communication bearers of each network operator in dependence on a scheduling priority attributed to the communication bearers of that network operator by the prioritising.

The invention also provides a base station for sharing resources of a communication bandwidth between a plurality of network operators, the base station comprising a processor configured to: define a respective proportion, for each network operator, representing a reserved proportion of the resources of said communication bandwidth to be allocated for a set of one or more communication bearers for that network operator; prioritise allocation of resources to the respective set of one or more communication bearers for each network operator in dependence on an analysis based on the proportion of that network operator, wherein said prioritising is operable to exclude the set of one or more communication bearers for at least one network operator from resource allocation, in the current scheduling round, in dependence on said analysis; and allocate resources, in a current scheduling round, to the communication bearers of each network operator in dependence on a scheduling priority attributed to the communication bearers of that network operator by the prioritising.

The invention also provides a base station for sharing resources of a communication bandwidth between a plurality of network operators, the base station comprising a processor configured to define: (a) a first operator proportion representing a reserved proportion of the resources to be allocated for a first set of one or more communication bearers for a first network operator; and (b) a second operator proportion representing a reserved proportion of the resources to be allocated for a second set of one or more communication bearers for a second network operator. The processor is configured to: prioritise allocation of resources to the respective set of one or more communication bearers for each network operator in dependence on an analysis based on the operator proportion of that network operator; and allocate resources, in a current scheduling round, to the respective communication bearers of each network operator in dependence on a scheduling priority attributed to the communication bearers of that network operator by the prioritising. The processor is operable: to allocate, to each communication bearer of a first group of communication bearers a respective predetermined amount of resources, in a priority order based on the scheduling priority attributed to the network operator to which each communication bearer of said first group of communication bearers belongs; and then to allocate, to each communication bearer of a second group of communication bearers, resources remaining after said allocation to each communication bearer of said first group of communication bearers, in a priority order based on the scheduling priority attributed to the network operator to which each communication bearer of said second group of communication bearers belongs.

The invention also provides a method performed by a base station for sharing resources of a communication bandwidth between a plurality of network operators, the method comprising defining: (a) a first proportion of said resources of said communication bandwidth, said first proportion representing a first virtual pool of resources; (b) a second proportion of said resources of said communication bandwidth, said second proportion representing a second virtual pool of resources; (c) for said first virtual resource pool: a respective first pool proportion, for each network operator, representing a reserved proportion of the resources of the first virtual pool to be allocated for a set of one or more communication bearers for that network operator; and (d) for said second virtual resource pool: a respective second pool proportion, for each network operator, representing a reserved proportion of the resources of the second virtual pool to be allocated for the set of one or more communication bearers for that network operator. The method also comprises prioritising allocation of resources to the respective set of one or more communication bearers for each network operator in dependence on an analysis based on the pool proportion of that network operator in at least one of said virtual resource pools; and allocating resources, in a current scheduling round, to the communication bearers of each network operator in dependence on a scheduling priority attributed to the communication bearers of that network operator by the prioritising.

The invention also provides a method performed by a base station for sharing resources of a communication bandwidth between a plurality of network operators, the method comprising: defining, for each network operator, a respective share of resources that would be allocated for a set of one or more communication bearers for that network operator if said communication bandwidth were in a congested state; prioritising allocation of resources to the respective set of one or more communication bearers for each network operator in dependence on said defined respective share of resources for that network operator; and allocating resources, in a current scheduling round, to the communication bearers of each network operator in dependence on a scheduling priority attributed to the communication bearers of that network operator by the prioritising.

The invention also provides a method performed by a base station for sharing resources of a communication bandwidth between a plurality of network operators, the method comprising: defining a respective proportion, for each network operator, representing a reserved proportion of the resources of said communication bandwidth to be allocated for a set of one or more communication bearers for that network operator; prioritising allocation of resources to the respective set of one or more communication bearers for each network operator in dependence on an analysis based on the proportion of that network operator, wherein said prioritising excludes the set of one or more communication bearers for at least one network operator from resource allocation, in the current scheduling round, in dependence on said analysis; and allocating resources, in a current scheduling round, to the communication bearers of each network operator in dependence on a scheduling priority attributed to the communication bearers of that network operator by the prioritising.

The invention also provides a method performed by a base station for sharing resources of a communication bandwidth between a plurality of network operators, the method comprising defining: (a) a first operator proportion representing a reserved proportion of the resources to be allocated for a first set of one or more communication bearers for a first network operator; (b) a second operator proportion representing a reserved proportion of the resources to be allocated for a second set of one or more communication bearers for a second network operator. The method also comprises: prioritising allocation of resources to the respective set of one or more communication bearers for each network operator in dependence on an analysis based on the operator proportion of that network operator; and allocating resources, in a current scheduling round, to the respective communication bearers of each network operator in dependence on a scheduling priority attributed to the communication bearers of that network operator by the prioritising; wherein said allocating: allocates, to each communication bearer of a first group of communication bearers a respective predetermined amount of resources, in a priority order based on the scheduling priority attributed to the network operator to which each communication bearer of said first group of communication bearers belongs; and then allocates, to each communication bearer of a second group of communication bearers, resources remaining after said allocation to each communication bearer of said first group of communication bearers, in a priority order based on the scheduling priority attributed to the network operator to which each communication bearer of said second group of communication bearers belongs.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

An exemplary embodiment of the invention will now be described, by way of example, with reference to the accompanying drawings in which.

DETAILED DESCRIPTION OF EXEMPLARY EMBODIMENTS

Overview

Figure 1:
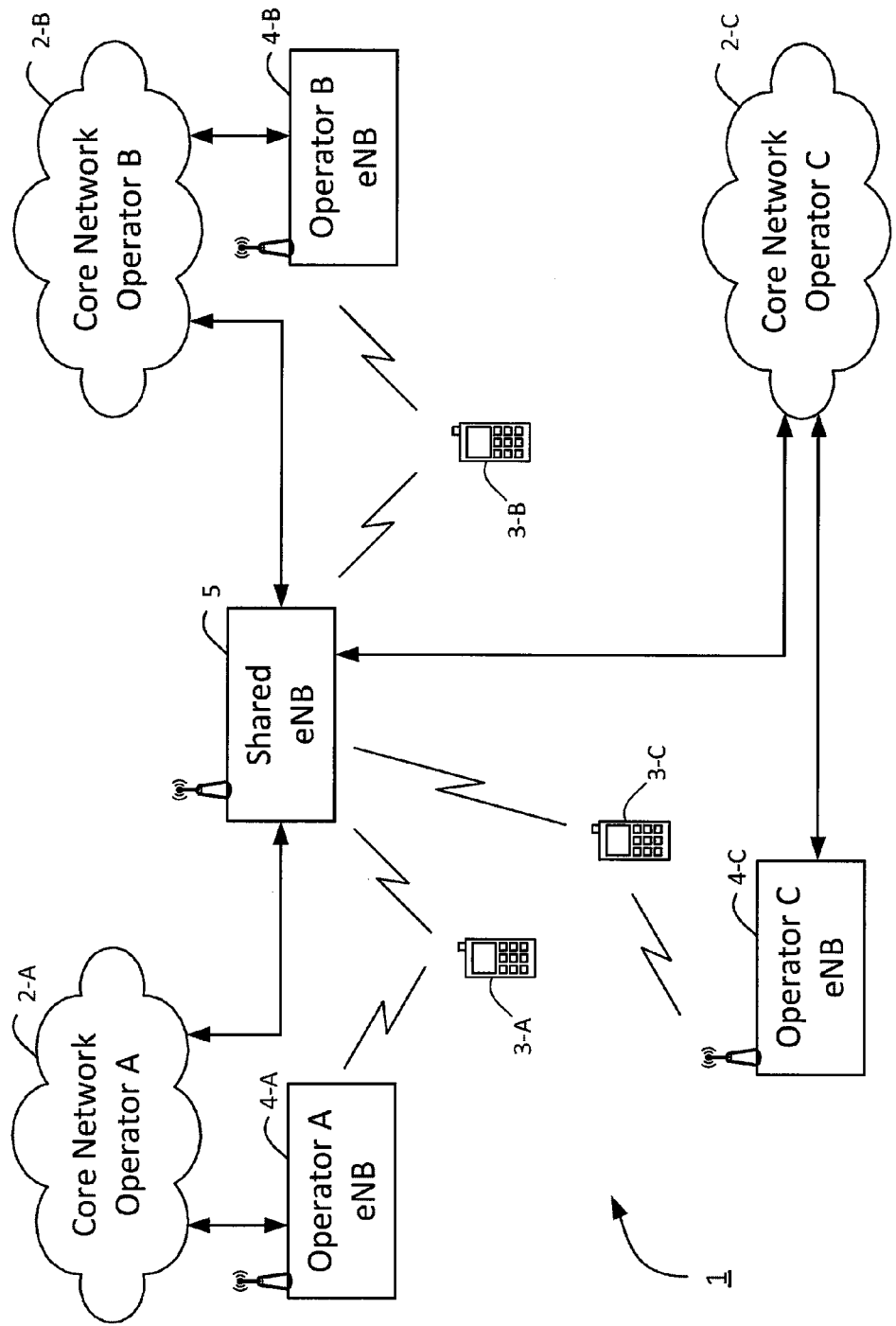
FIG. 1 schematically illustrates a mobile telecommunication system of a type to which the invention is applicable.

FIG. 1 schematically illustrates a mobile (cellular) telecommunication system 1 in which three network operators (denoted operators A, B, and C) are able to provide a mobile wireless communications service. Operator A has a core network 2-A, operator B has a core network 2-B, and operator C has a core network 2-C. Each operator may also provide one or more base stations or eNBs 4-A, 4-B, and 4-C as part of a radio access network (RAN) for allowing one or more mobile telephones, or other such user equipment 3-A, 3-B, and 3-C to connect to their network and receive the service. As will be understood by those skilled in the art, each base station 4 operates one or more base station cells in which communications can be made between the base station 4 and the mobile telephones 3. For an eNB 4 associated with an operator, such as eNB 4-A associated with operator A, typically only mobile telephones 3-A associated with the relevant operator are able to connect and interact with the wireless communication system via that eNB 4-A. Thus, only mobile telephones 3-A configured to access services via service provider A are able to connect to the network via operator A's eNB 4-A without "roaming" away from their home network.

The telecommunications system 1 further includes a shared base station 5 (denoted shared eNB 5). The shared base station 5 might be owned and operated by any of operators A, B, and C or a third party (e.g. a further network operator). Alternatively, the shared base station 5 might be jointly owned and operated by two or more operators. In any case, operators A, B, and C agree to share in the capacity of the shared eNB 5 such that any of a mobile telephone 3-A associated with operator A, a mobile telephone 3-B associated with operator B, and a mobile telephone 3-C associated with operator C are able to connect to the network via the shared eNB 5 as though connecting through equipment provided by their own respective network operator. Thus, mobile telephone 3-A may connect or handover to the shared eNB 5 as though the shared eNB 5 is an eNB associated with operator A, while mobile telephone 3-B is able to connect to shared eNB 5 as though the shared eNB 5 is an eNB associated with operator B and mobile telephone 3-C is able to connect to shared eNB 5 as though the shared eNB 5 is an eNB associated with operator C.

Thus, the shared base station 5 can be connected to by mobile telephones 3 associated with any of the network operators A, B or C that share the base station 5, as though that base station 5 was a base station belonging to the respective network operator.

Such an arrangement may be particularly useful, for example, in areas of low population density, or more generally areas having low bandwidth requirements, in order to allow each network operator to provide their service to that area without requiring any of the network operators to install their own RAN in that area. In contrast, in areas with higher capacity requirements the network operators may choose to install their own RANs rather than sharing capacity.

It is noted that the RAN sharing employed in the telecommunications system 1 is significantly different to a 'roaming' mechanism in which a mobile telephone associated with a first network operator forms a connection via the network of a different service provider.

Specifically, in a roaming situation, the connection with the mobile telephone is monitored and controlled by the visited network which then subsequently bills the home network of the mobile telephone (generally resulting in significantly increased cost to the end user). In contrast, the sharing of the radio access network, as in the current embodiment, is transparent to users of the network, and monitoring and control of connections is performed using standard mechanisms as though the mobile telephone was connected via the network operator's own RAN.

Data is communicated between the base stations 4, 5 and user equipment using radio frames (typically of 10 ms duration in LTE) comprising a number (typically ten) sub-frames with each sub-frame comprising a pair of 'slots'. In the frequency domain each slot is divided into frequency resource blocks each comprising a plurality (typically twelve in LTE) sub-carriers. Within each slot, therefore, resources can be allocated to user equipment using units of frequency referred to as physical resource blocks (PRBs), each of which represents the smallest unit of resources that can be allocated to any user equipment 3 transmitting/receiving data over the air interface. When a particular communication instance is first initiated for a particular piece of user equipment 3 a communication bearer is set up, from the user equipment 3, for guiding the data being communicated through the network. Sufficient resources (e.g. PRBs) are allocated to the communication bearer, by the base station 4, 5 to enable successful communication.

In the telecommunication system 1 of FIG. 1, typically, the network operators will contract to be provided with a certain proportion (reserved proportion) of the resources available at the shared base station 5. A group of communication bearers authorised to use the reserved proportion of the available resources associated with a particular operator is referred to as that operator's 'slice'.

In this embodiment, the communication resources available via shared base station 5 are treated as being distributed into a number of virtual 'resource pools', each of which comprises a virtual set of resources that are available for allocation to one or more network operators. The virtual division of resources into resource pools allows for greater flexibility in allocating and/or scheduling resources to the network operators sharing that shared base station 5. For example, the virtual division into resource pools allows greater flexibility to configure the relative amount of resources (such as minimum/maximum/average amount of resources) for each operator in one resource pool essentially independently from the configurations applied in another resource pools. This flexibility allows, for example: the application of different scheduling methods in different resource pools; the reservation of a particular resource pool for the sole use of a particular operator whilst another pool is shared by more than one operator; the allocation of different sharing priorities in different resource pools; the apportionment of different proportions of resources of different resource pools to the same operator; etc.

It will be appreciated that the resource pools may not necessarily correspond to specific physical resources but rather to blocks of virtual resources that may change each scheduling round. Resource pools can therefore be regarded as 'virtual' constructs upon which an improved set of rules that govern how much of the shared base station 5 resources each operator slice is allowed to use can be implemented.

Each resource pool has a predetermined 'size', expressed as a fraction of the total shared resources that are available via the shared base station 5 in all resource pools. The sum of the sizes of all resource pools is therefore equal to 1 (unless some of the available resources are reserved for some other 'non-resource pool' use).

In each scheduling round, the shared base station 5 works out, whether each operator slice is currently using less or more resources than its reserved proportion. In order to do so, the shared base station 5 processes each resource pool in a predetermined order (e.g. in an increasing order according to a resource pool index (or 'number') associated with a respective resource pool) and checks the amount of the resources being used by each operator slice, in each resource pool. If the shared base station 5 finds any operator slice, the bearers of which are using more resources (across all resource pools) than the respective reserved proportion for that operator, then it blocks that operator slice from receiving any resource allocations in the current scheduling round (or 'sub-frame').

Next, for a particular scheduling round (or 'sub-frame'), the shared base station 5 constructs a prioritised list of operator slices in descending order of a respective scheduling priority for each operator slice. The shared base station 5 includes, in this list, only those operator slices that are not using more resources (across all resource pools) than the respective reserved proportion for the corresponding network operator (i.e. the prioritised list comprises only those operator slices that are not blocked from receiving resource allocations in the current scheduling round). Each operator slice in the list is assigned a respective proportion (reserved pool proportion) of the resources available in each resource pool that it is allowed to use.

After all operator slices have been processed, the shared base station 5 performs scheduling of transmissions for the communication bearers belonging to operator slices included in the prioritised list, starting from the operator slice having the highest priority and then continuing with the remaining operator slices in decreasing order of priority. Since any operator slices having a resource usage (over all resource pools) that do not comply with the applicable sharing rules (i.e. using more resources than the corresponding operator proportion) are blocked from resource allocation in the current scheduling round, their average resource usage is effectively reduced. Since the shared base station 5 performs the selective blocking and prioritisation processes for each scheduling round, if the average resource usage of a previously blocked operator slice has been reduced to (or below) the corresponding reserved proportion of that operator in a subsequent scheduling round, the shared base station 5 will consider again any such operator slice for resource allocation in that scheduling round (and according to the prioritisation established for that scheduling round).

The scheduling priorities for each slice may be determined by comparing the respective reserved pool proportion for a particular resource pool with the remaining resource needs of that slice (over all resource pools that that particular slice is allowed to use), based on a measurement of current usage. For example, if a slice requires a lower share of the total available resources (based on a measurement of current usage) than can be provided by that slice's reserved proportion of a resource pool being processed, then the slice is added to the prioritised list with a higher priority than another slice that requires a greater share of the total available resources than can be provided by that slice's reserved proportion of the resource pool. Where more than one slice respectively requires a lower share of the total available resources, based on a measurement of current usage, than can be provided by that slice's reserved pool proportion then the slices are prioritised in descending order of the ratio of the reserved pool proportion of the resource pool being processed for that slice to the share of the total available resources required by that slice.

Once the shared based station 5 has established the list of scheduling priorities it can schedule resources to each slice based on the scheduling priorities.

The shared base station 5 is thus beneficially able to ensure fairness of allocations among the various network operators sharing its resources. The shared base station 5 is also able to ensure that each network operator has an opportunity to transmit, on average, according to their respective reserved proportions of the shared base station's 5 resources. However, each operator can temporarily use more than its reserved proportion without compromising on the amount of resources available to other operators (e.g. to an operator that could transmit, in the current scheduling round, with a relatively low scheduling priority only). This approach is not only beneficial for achieving fairness of sharing resources but it also maximises usage of the shared base station's 5 resources, such that, on average, more mobile telephones 3 can transmit more data via the shared base station 5 than using other shared base stations employing other scheduling methods.

For each operator sharing the base station 5, the shared eNB 5 is beneficially able to provide, on average, a respective guaranteed minimum quantity of resources (e.g. number of PRB s per sub-frame). The minimum guaranteed quantity of resources for a particular operator can be considered, effectively, to be a reserved proportion (also referred to as a 'reserved part') of the total available resources in which that operator's communications have priority over those of other operators.

This will advantageously result in improved service continuity for the users of these network operators without any of the network operators having to commit to (and thus pay for) larger capacity of the shared base station 5 than they would normally require. Additionally, using separate resource pools of the shared base station 5, the network operators can benefit from greater flexibility and convenience in making changes to their sharing configuration according to their current needs.

Shared Base Station (eNB)

Figure 2:
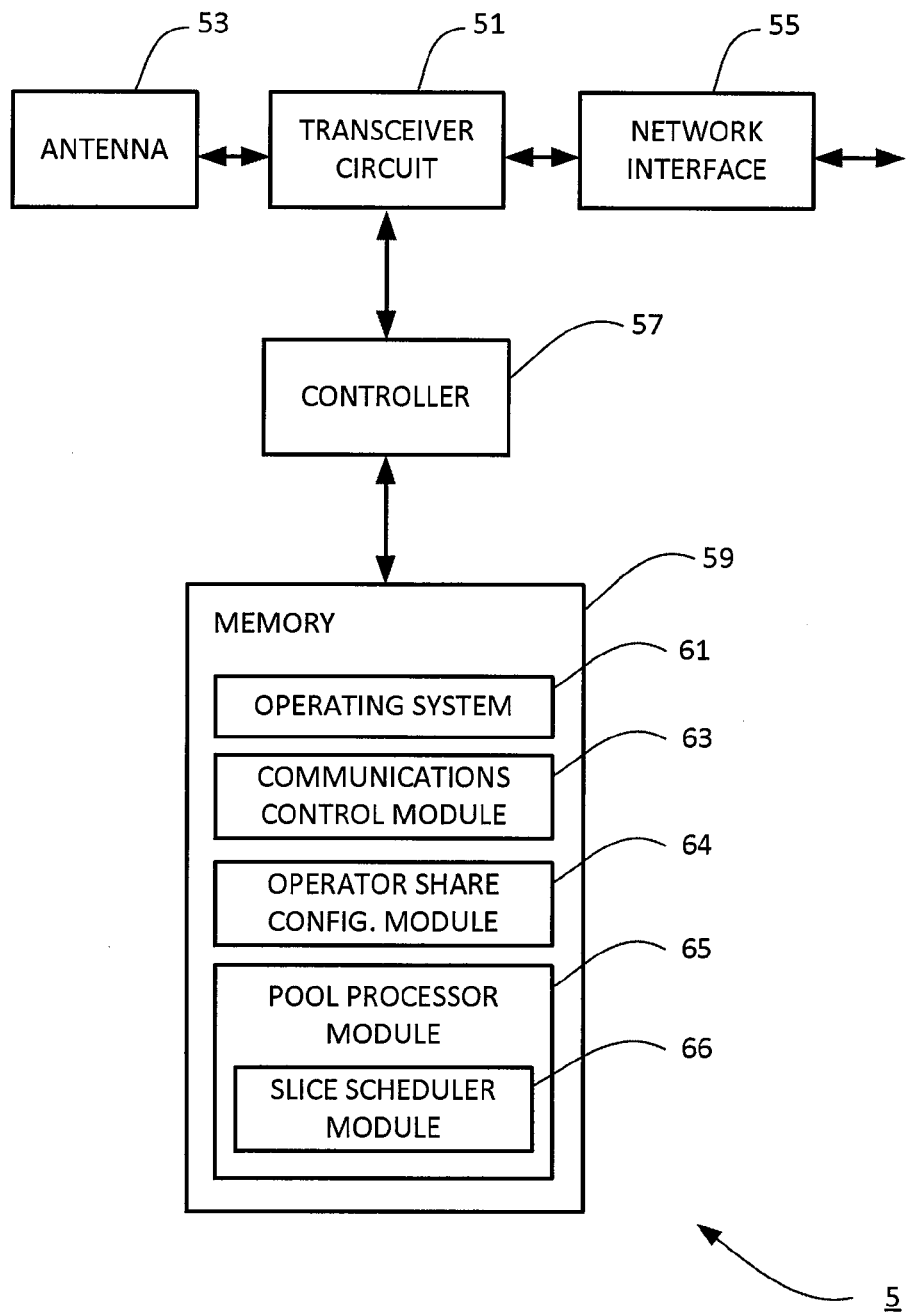
FIG. 2 is a block diagram of a shared base station suitable for use in the telecommunications networks of FIG. 1.

FIG. 2 is a block diagram illustrating the main components of the shared base station 5 shown in FIG. 1. As shown, the shared base station 5 includes transceiver circuitry 51 which is operable to transmit signals to and to receive signals from the mobile telephones 3 via one or more antennae 53 and which is operable to transmit signals to and to receive signals from the core networks 2 and/or other base stations 4 via a network interface 55. The network interface typically includes an S1 interface for communicating with the core networks 2 and an X2 interface for communicating with other base stations. A controller 57 controls the operation of the transceiver circuitry 51 in accordance with software stored in memory 59. The software includes, among other things, an operating system 61, a communications control module 63, an operator share configuration module 64, a pool processor module 65, and a slice scheduler module 66.

The communications control module 63 is operable to control the communication between the shared base station 5 and the mobile telephones 3 and other network entities that are connected to the base station 5. The communications control module 63 also controls the separate flows of uplink and downlink user traffic and control data to be transmitted to the communications devices served by the shared base station 5 including, for example, control data for managing operation of the mobile telephones 3.

The operator share configuration module 64 is operable to store and manage configuration data for defining each respective network operator's reserved proportion of resources of the resources available in each resource pool. This configuration data is also provided to the other modules of the shared base station 5 when needed. For example, the pool processor module 65 may rely on the configuration data provided by the operator share configuration module 64 when determining whether or not resources that have been already allocated to a particular network operator in previously processed resource pools have reached/exceeded the proportion of resources reserved for that particular network operator.

The pool processor module 65 is responsible for dynamically processing each resource pool, for both the downlink and uplink directions. The pool processor module 65 is operable to maintain, for each resource pool and in each scheduling round, a list of slices in descending order of their respective scheduling priorities.

The slice scheduler module 66 (which is part of and/or works in conjunction with the pool processor module 65) is operable to allocate PRBs for communication bearers belonging to each operator slice based on the respective reserved proportion of the available frequency resources for that operator in a given resource pool. The slice scheduler module 66 is operable to allocate PRBs for the operator slices according to the list of resource priorities maintained by the pool processor module 65.

Mobile Telephone

Figure 3:
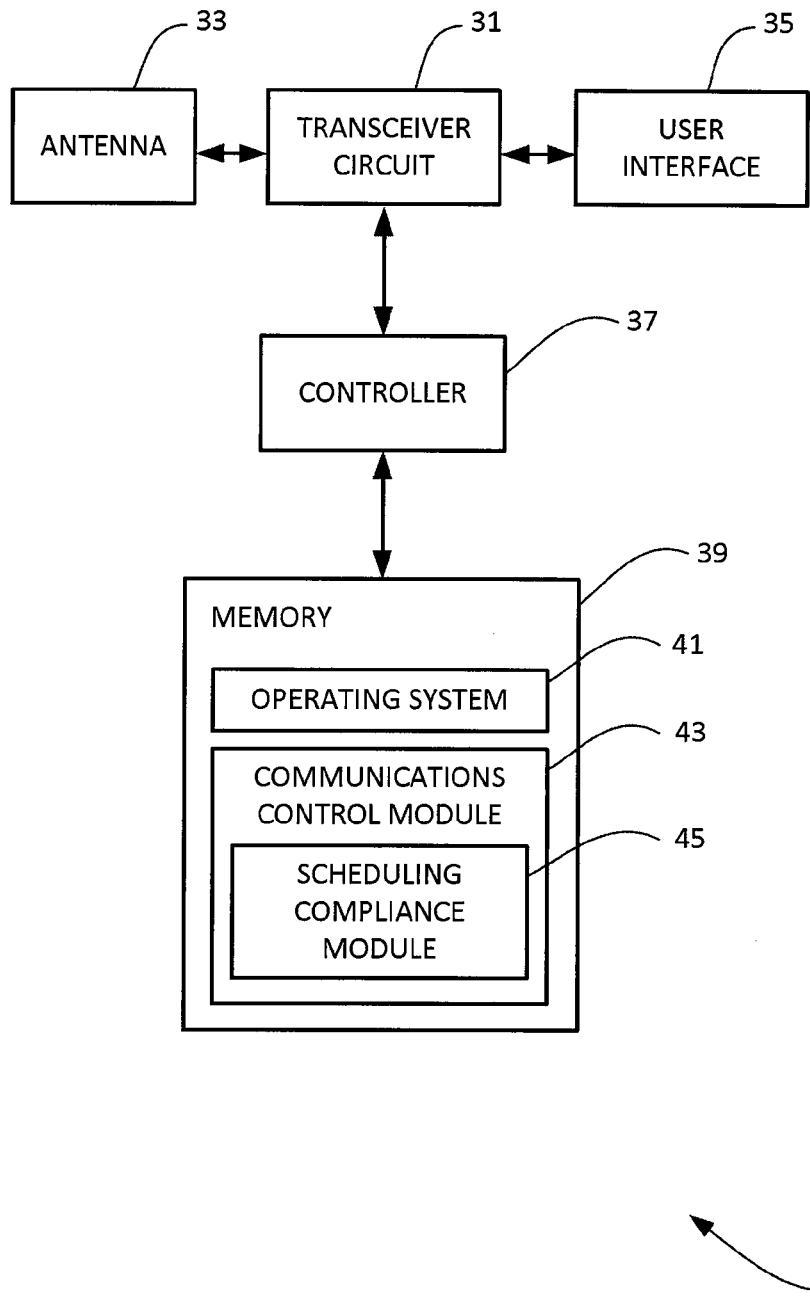
FIG. 3 is a block diagram of a mobile telephone suitable for use in the telecommunications networks of FIG. 1.

FIG. 3 is a block diagram illustrating the main components of the mobile telephone 3 shown in FIG. 1. As shown, the mobile telephone 3 has a transceiver circuit 31 that is operable to transmit signals to and to receive signals from a base station 4, 5 via one or more antenna 33. Although not necessarily shown in FIG. 3, the mobile telephone 3 may of course have all the usual functionality of a conventional mobile telephone 3 (such as a user interface 35) and this may be provided by any one or any combination of hardware, software and firmware, as appropriate. The mobile telephone 3 has a controller 37 to control the operation of the mobile telephone 3. The controller 37 is associated with a memory 39 and is coupled to the transceiver circuit 31. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communications control module 43, and a scheduling compliance module 45.

The communications control module 43 is operable to control the communication between the mobile telephone 3 and the base stations 4, 5. The communications control module 43 also controls the separate flows of uplink data and control data that are to be transmitted to the base station 5. The communications control module 43 also includes the scheduling compliance module 45.

The scheduling compliance module 45 is operable to receive information, from the corresponding scheduler module of the base station (such as the pool/slice scheduler modules of the shared base station 5 or a MAC scheduler module of a conventional base station 4), relating to scheduling of (uplink/downlink) communications for this mobile telephone 3. The scheduling compliance module 45 uses this information to control the resources used for any uplink/downlink communications related to active communication bearers of this mobile telephone 3.

In the above description, the shared base station 5 and the mobile telephone 3 are described for ease of understanding as having a number of discrete modules (such as the communications control modules, the pool processor module, and the slice scheduler module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation—Multiple Resource Pools

A more detailed description will now be given of the scenario discussed above where a shared base station 5 optimises its resources for transmitting data to/from mobile telephones 3 belonging to more than one network operators.

The slice scheduler 66, (sometimes referred to as a 'Network Virtualisation Substrate' or 'NVS' slice scheduler), schedules the slices based on the priorities dictated by the pool processor 65 of the shared base station 5. Each 'slice' can be considered as a set of communication bearers authorised to use at least a proportion of the associated resources.

In this exemplary method, each operator slice corresponds to one operator only, i.e. a slice includes all communication bearers belonging to one operator but no bearers belonging to any other operator.

Each operator slice may be attributed a slice weight, which is calculated as follows:

$$w_{g,j} = \frac{t_g^{rsv}}{t_{g,j}^{exp}}$$

where g is an operator slice index, $0 \le t_g^{rsv} \le 1$ is the size of the reserved proportion for operator g expressed as a fraction of the total resources of the system bandwidth, j is a sub-frame number for the current sub-frame for which resources are to be allocated, and $t_{g,j}^{exp}$ is a measure of resource usage for operator slice g before including the resources assigned in sub-frame j, e.g. calculated using measure(s) of resource usage from the previous sub-frame(s).

The value of $t_{g,j}^{exp}$ may be updated at each sub-frame using an exponential weighted moving average:

$$t_{g,j}^{exp} = (1-\beta)t_{g,j-1}^{exp} + \beta \frac{N_{g,j-1}}{K}$$

where β is, effectively, a forgetting factor parameter in the range 0 to 1 (where a value of 1 means that resource usage in previous sub-frames is ignored), K is the number of resources (e.g. PRBs) in the system bandwidth and $N_{g,j-1}$ is the total number of resources assigned in a sub-frame immediately preceding sub-frame j to all communication bearers belonging to operator slice g.

Scheduling algorithms, such as the NVS slice scheduler, examine the current measured resource usages of each slice, and set the scheduling priority of each slice based on a predetermined sharing rule.

As summarised above, in this embodiment however, the system resources are divided into an arbitrary number of virtual 'pools'.

The resource pools are advantageously defined such that, where the number of pools is M, and the size of the $m^{th}$ pool is $P_m$ (expressed as a proportion or 'fraction' of the total available resources), the sum of the size of all pools is 1

$$\left(\sum_{m=0}^{M-1} P_m = 1\right).$$

The owner(s) of the shared base station 5 may specify which pools each operator is allowed to use, and may set a different reserved pool proportion for each operator in each pool. Whenever there are changes to the resource pools and/or reserved pool proportion, the operator share configuration module 64 updates the resource pool configurations accordingly. These configurations may generally be in accordance with the applicable contracts between the owner(s) of the shared base station 5 and/or each network operator. However, the configurations may also be changed depending on current network load and/or other operating conditions of the shared base station 5.

A simple example of a possible resource pool configuration is illustrated in Table 1 below. In this example, there are three separate resource pools provided by the shared base station 5 and there are three network operators sharing this shared base station 5. For example, the network operators may be 'Operator A', 'Operator B', and 'Operator C' shown in FIG. 1, corresponding to 'Slice 0', 'Slice 1', and 'Slice 2' of Table 1, respectively. The sign 'X' indicates that the corresponding operator slice is not allowed to use the corresponding resource pool and $t_{m,g}^{rsv}$ denotes the reserved pool proportion for an operator slice denoted 'g' in a resource pool denoted 'm'.

TABLE 1

|  | Pool 0 | Pool 1 | Pool 2 |
| --- | --- | --- | --- |
| Pool size, $P_m$ | 0.4 | 0.5 | 0.1 |
| Slice 0, $t_{m,0}^{rsv}$ = | 0.25 | 0.3 | X |
| Slice 1, $t_{m,1}^{rsv}$ = | 0.75 | 0.2 | X |
| Slice 2, $t_{m,2}^{rsv}$ = | X | 0.5 | 1.0 |

Figure 4:
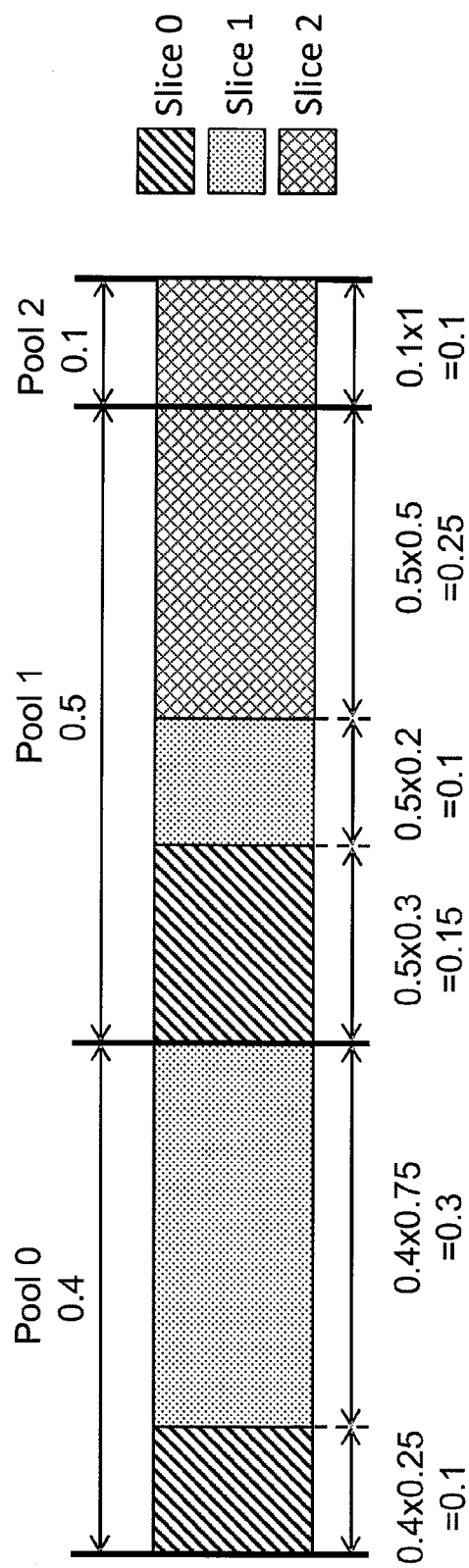
FIG. 4 shows a resource allocation scenario when an example slice scheduling method is applied.

FIG. 4 shows a resource allocation scenario, based on the resource pool configurations set out in Table 1, in which all operator slices are currently experiencing a relatively high level of traffic (e.g. resulting in a load of the shared base station 5 being close to or even reaching 100%) and will therefore use all the resources available to them. FIG. 4 shows how the resources are allocated in this case. In particular, in this scenario as illustrated in Table 1, 'Slice 0' has a reserved pool proportion of 0.25 (or 25%) in 'Pool 0' and 0.3 (or 30%) in 'Pool 1'. 'Slice 0' is allocated the full 0.25 (or 25%) share of resource pool 0 and the full 0.3 (or 30%) share of resource pool 1. Resource pool 0 has a size corresponding to a 0.4 (or 40%) share of the total resources and resource pool 1 has a size corresponding to a 0.5 (or 50%) share of the total resources. Accordingly, slice 0 receives a 0.1 (0.4×0.25) share of the total resources in pool 0 and a 0.15 (0.5×0.3) share of the total resources in pool 1 giving a total 0.25 (or 25%) share of the total resources.

'Slice 1' is allocated the full 0.75 (or 75%) share of resource pool 0 and the full 0.2 (or 20%) share of resource pool 1. Accordingly, slice 1 receives a 0.3 (0.4×0.75) share of the total resources in pool 0 and a 0.1 (0.5×0.2) share of the total resources in pool 1 giving a total 0.4 (or 40%) share of the total resources.

'Slice 2' is allocated the full 0.5 (or 50%) share of resource pool 1 and, as the only slice allowed to use it, a full (100%) share of resource pool 2. Accordingly, slice 2 receives a 0.25 (0.5×0.5) share of the total resources in pool 1 and a 0.1 (0.1×1) share of the total resources in pool 2 giving a total 0.35 (or 35%) share of the total resources.

Figure 5:
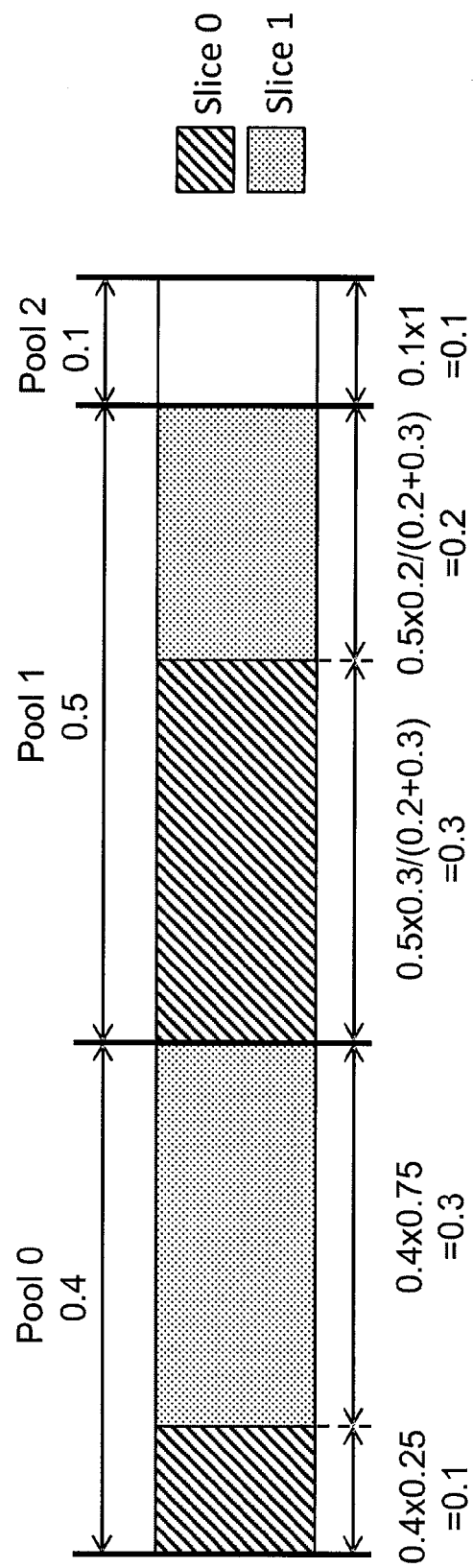
FIG. 5 shows another resource allocation scenario when the example slice scheduling method is applied.

FIG. 5 shows another resource allocation scenario, based on the resource pool configurations set out in Table 1, in which only 'Slice 0' and 'Slice 1' are experiencing a relatively high level of traffic, whilst 'Slice 2' has (nearly) zero level of traffic. In this scenario, therefore, slice 2 can have its resource requirements fulfilled without requiring the use of any resources in pool 1 or pool 2.

In this case, the resources of pool 1 that would otherwise be used by slice 2 are shared between the remaining operators that are allowed to use pool 1. However, the allocation of resources from pool 0 is unaffected because slice 2 is not allowed to use those resources. The allocation of resources from pool 2 is also unaffected because slices 0 and 1 are not allowed to use those resources.

Slice 0 is therefore allocated its full 0.25 (or 25%) share of resource pool 0 and a share of resource pool 1 dictated by relative sizes of the reserved pool proportions for slice 0 and slice 1 and the size of the unused part of pool 1 (in this example all of pool 1). Specifically, slice 0's share of pool 1 is given by the size of its reserved pool proportion for slice 1 multiplied by the ratio of the size of the unused part of pool 1 to the combined size of slice 0's and slice 1's reserved pool proportions for slice 1. Accordingly, slice 0 receives a 0.1 (0.4×0.25) share of the total resources in pool 0 and a 0.3 (0.5×0.3/(0.2+0.3)) share of the total resources in pool 1 thereby giving a total 0.4 (or 40%) share of the total resources.

Similarly, slice 1 receives a 0.3 (0.4×0.75) share of the total resources in pool 0 and a 0.2 (0.5×0.2/(0.2+0.3)) share of the total resources in pool 1 thereby giving a total 0.5 (or 50%) share of the total resources.

Operation—Generalised Slice Scheduler with Selective Blocking

A more detailed description will now be given of a slice scheduler algorithm that can be used to realise a resource sharing scheme for the shared base station 5 to optimise its resources for transmitting data to/from mobile telephones 3 belonging to more than one network operators.

In essence, the proposed slice scheduler algorithm applies the following general procedure:

1. Given the measured resource usages $t_{g,j}^{exp}$ of each operator slice at the start of a sub-frame denoted 'j', the slice scheduler 66 applies a set of sharing rules to work out whether each slice is currently using less or more resources than its share. In this context, in addition to the reserved proportion of the corresponding network operator, a network operator's 'share' may also include any part of a reserved proportion of any other network operator which is 'assignable' to that operator, in the current sub-frame, based on the applied sharing rules (e.g. because it is unused by that other network operator). In other words, the slice scheduler determines in this step whether communication bearers of each slice have less or more PRBs allocated to them than the reserved proportion of the corresponding network operator (including any proportion assigned from other network operators).

2. If a slice is currently using more resources than its share (i.e. the maximum amount it is allowed to use under the sharing rules), then the slice scheduler 66 blocks that slice in sub-frame 'j'. Blocked slices are excluded from scheduling so they cannot be assigned any resources in the current scheduling round.

3. The slice scheduler 66 sets the scheduling priorities of each slice in a sub-frame denoted 'j' based on the following principle: if a slice is using less than its share, it must be given a higher priority than any other slice that is borrowing its unused resources. (Of course the scheduling priority of slices that are blocked by step 2 is arbitrary, since they cannot be scheduled anyway).

4. Finally, the slice scheduler 66 performs scheduling based on the outcome of steps 1-3, and updates the measured resource usage of each slice.

It will be appreciated that the 'share' of a slice is not necessarily a fixed quantity because it may depend on the resource usage of other slices, according to the sharing rules. For example, in the scenario shown in FIG. 4 the share of 'Slice 0' is 0.25, whereas in the scenario shown in FIG. 5 the share of 'Slice 0' is 0.4.

Step (1) makes the implicit assumption that if a slice is using less than its share, then this must be because this slice does not have enough traffic to use all of its share. This assumption is always valid provided that the principle of priority setting given in step (3) is followed. This ensures that a slice can, effectively, 'reclaim' unused resources that may have been borrowed by other slices while it did not need them.

If there is no maximum limit on the resource that may be used by any slice (because any slice may use all resources in the cell if no other slice is using them, e.g. using an NVS slice scheduler), then step (2) may be redundant. However step (2) is used in the multiple-pool case in order to prevent a slice from using any pool to which it should not have access.

In the case of multiple resource pools, it is assumed that each slice fills its available resources in increasing order of pool number. In other words, a given slice will use resources in any pool m only if it is already using all resources available to it in pools 0 to m−1.

In order to implement step (1) above, the pool processor 65 (that includes the slice scheduler 66) works out how much resource each slice needs to use or is allowed to use (whichever is the smaller) in each pool.

Where $t_{m,g,j}^{pool}$ is the proportion of resources that a slice denoted 'g' is allowed to obtain in a resource pool denoted 'm' in the current sub-frame denoted 'j' (and $t_{m,g,j}^{pool}=0$ for a slice 'g' that is not allowed to use resource pool 'm'), the following algorithm, (i.e. procedure A, set out in steps a) to h) below), can be used by the pool processor 65 to compute $t_{m,g,j}^{pool}$.

Procedure A:
a) Initialise:
   m=0
   $t_g^{req}=t_{g,j}^{exp}$ for all g (to initialise a 'required' resource usage for slice 'g' with the measure of resource usage for slice 'g' for sub-frame 'j' (but before the resources of the sub-frame 'j' have been allocated), as defined previously)
b) Set:
   if slice 'g' is allowed to use pool 'm', then a flag $f_g$ is set to 1 (to indicate that slice 'g' is allowed to use pool 'm');
   otherwise $f_g=0$ (to indicate that slice 'g' is not authorised to use pool 'm');

$t_{m,g,j}^{pool}=0$ for all g (the amount of resources that slice 'g' can obtain in a resource pool 'm' in sub-frame 'j' is initially set to zero before being updated in step c)); and
   $Q=P_m$ (the initial remaining resources, Q, that can be distributed among the slices that are allowed access to the resource pool denoted 'm' is set to equal the size of the $m^{th}$ pool)
c) For all g (i.e. for all slices), update $t_{m,g,j}^{pool}$ by distributing the resource Q amongst all slices that are entitled to use the resource pool 'm' in proportion to their respective $t_{m,g}^{rsv}$ (i.e. in proportion to the reserved pool proportions for each slice in resource pool 'm'):

$$t_{m,g,j}^{pool} \leftarrow t_{m,g,j}^{pool} + Q \frac{f_g t_{m,g}^{rsv}}{\sum_k f_k t_{m,k}^{rsv}}$$

(i.e. the amount of resources that slice 'g' is allowed to obtain in a resource pool 'm' in sub-frame 'j' is increased by the ratio of that amount over the sum of the amounts of all slices in resource pool 'm');
d) Set Q=0 (i.e. following resource distribution in step c) the remaining resources that can be distributed among the slices is set to zero).
e) For each slice that satisfies the conditions $f_g=1$ and $t_{m,g,j}^{pool} \geq t_g^{req}$, do the following:

$Q \leftarrow Q+(t_{m,g,j}^{pool}-t_g^{req})$;

$t_{m,g,j}^{pool} \leftarrow t_g^{req}$;

and $f_g \leftarrow 0$.

(This effectively ignores each slice that has been provided with resources of the current pool in excess of the measure of required resource usage for that slice and releases the excess resources reserved for that slice)
f) If Q>0 and $$\sum_g f_g > 0$$

then go to step c), else continue.
   (If there are any excess resources released at step e) and there are slices that have not been ignored then the released excess resources are redistributed to those slices at c))
g) Set:

$t_g^{req} \leftarrow t_g^{req}-t_{m,g,j}^{pool}$ for all g;

m←m+1.

measure of the required resources for each slice are reduced commensurate with the resources of the current resource pool that have been distributed to that slice and then the pool number ('index') is incremented for the procedure to continue with the next pool (if any) in step h))
h) If m<M go to step (b) (i.e. process the next resource pool), else stop (if there are no more resource pools remaining).

As can be seen above, the pool processor 65 processes each pool in turn. For a given pool 'm', it begins (in step c)) by attributing to each slice that has access to pool 'm' its guaranteed minimum resource share of pool 'm' based on $t_{m,g}^{rsv}$. If any slice does not need all of this resource (i.e. if $t_{m,g,j}^{pool} \geq t_g^{req}$) then that slice is considered to be satisfied and it is removed from further consideration by setting $f_g=0$. In this case the excess amount $t_{m,g,j}^{pool} - t_g^{req}$ is returned to the pool to be redistributed amongst the remaining slices. This process continues until either all slices are satisfied or there are no more resources to redistribute. Then, in step h), the pool processor 65 proceeds to the next pool.

The realisation of the selective blocking of step (2) of the above general procedure requires that a slice is blocked in sub-frame 'j' if its total measured resource usage (based on the above resource pool processing) exceeds the total amount it is allowed to obtain in all pools, i.e. slice 'g' is blocked from receiving resource allocations in sub-frame 'j' if and only if the following condition is met:

$$t_{g,j}^{exp} > \sum_{m=0}^{M-1} t_{m,g,j}^{pool}$$

Step (3) of the above general procedure requires the pool processor 65 to construct a list of slices in descending order of scheduling priority. This list can in fact be constructed during step (1), as follows. The pool processor 65 begins by initialising the priority list to an empty list. In step (e) above, when the pool processor 65 finds a slice that satisfies the conditions $f_g=1$ and $t_{m,g,j}^{pool} \geq t_g^{req}$ then it adds that slice to the priority list. If more than one slice satisfies this condition at the same time, the pool processor 65 adds them to the priority list in descending order of the quantity $$\frac{t_{m,g,j}^{rsv}}{t_g^{req}}$$

(which is analogous to the NVS weight in the original NVS algorithm). When processing of the last pool is complete, the pool processor 65 adds any remaining slices to the priority list in arbitrary order.

Figure 6:
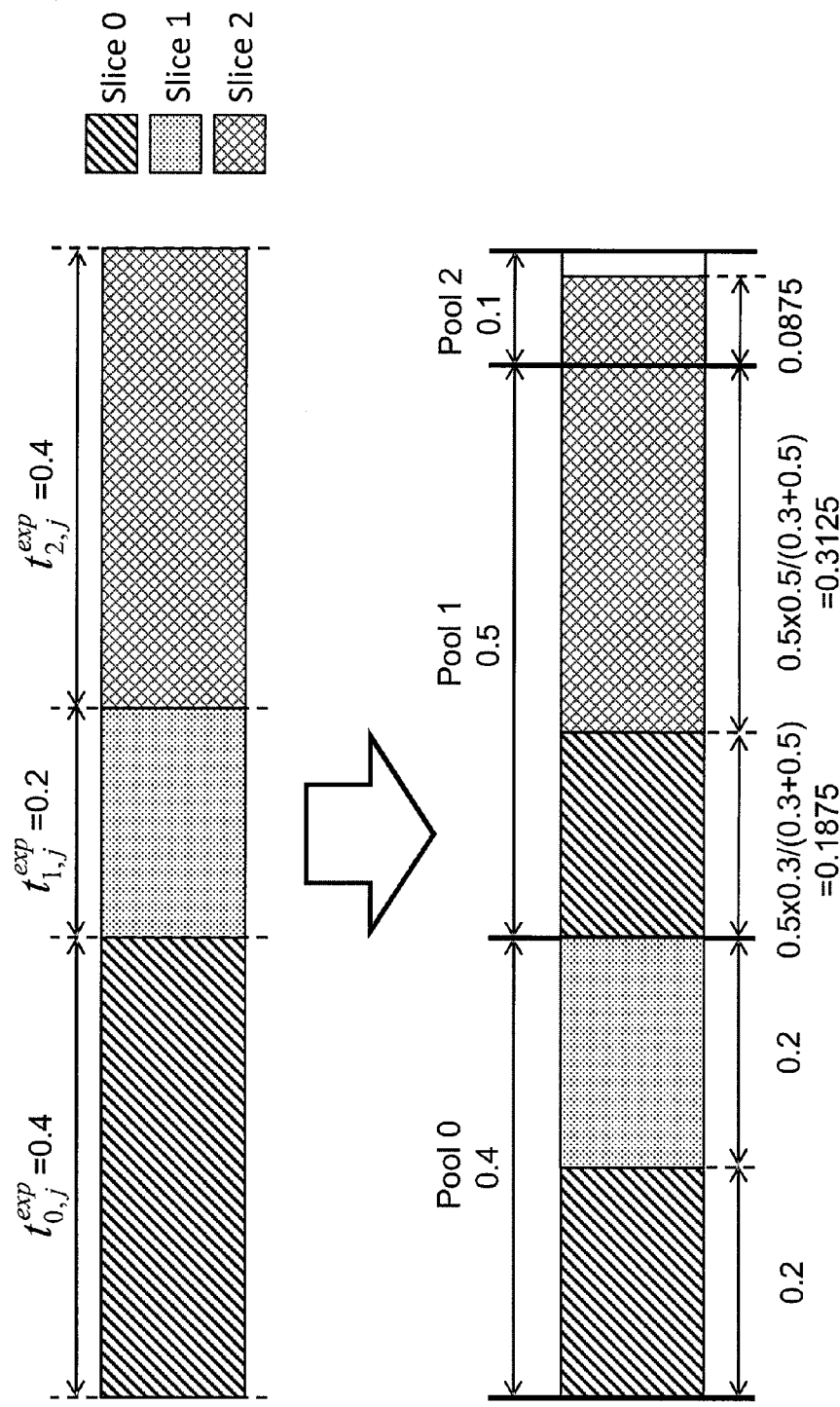
FIG. 6 shows yet another resource allocation scenario when the example slice scheduling method is applied.

FIG. 6 shows yet another resource allocation scenario when the example slice scheduling method is applied. The resource allocation scenario of FIG. 6 is based on the configuration shown in Table 1.

In this example, the measured resource usages $t_{g,j}^{exp}$ observed in a particular sub-frame 'j' are assumed to be 0.4, 0.2, and 0.4 for 'Slice 0', 'Slice 1', and 'Slice 2' respectively. 'Slice 1' is entitled to a minimum of 0.3 in 'Pool 0' (as per Table 1), but it only needs to use 0.2 based on its current usage. This leaves an excess of 0.1 which can be redistributed to other slices. Since only 'Slice 0' and 'Slice 1' are allowed to use 'Pool 0', 'Slice 0' is therefore able to receive all of the excess amount, in addition to its own minimum share of 0.1, effectively allowing 'Slice 0' a total of 0.2 proportion, of the all resources, from 'Pool 0'. Since the requirements of 'Slice 1' have effectively already been satisfied by the virtual resources of 'Pool 0', all of the virtual resources of 'Pool 1' can effectively be distributed between 'Slice 0' and 'Slice 2' in proportion to their reserved pool proportions in 'Pool 1' (i.e. in the ratio 0.3:0.5). Thus 'Slice 0' and 'Slice 2' receive 0.1875 and 0.3125 respectively in 'Pool 1'. 'Slice 2' is entitled to use all the virtual resources of 'Pool 2' but requires only 0.0875 to satisfy its current usage. Therefore at the end of the procedure, the pool processor 65 establishes that, based on the applicable sharing rules, only the measured resource usage of 'Slice 0' cannot be satisfied by the resources reserved for it across all the resources pools. Effectively, this means that 'Slice 0' is using more resource than it is entitled to, and it is therefore blocked from scheduling in sub-frame 'j'. The slice priorities in this case would therefore be determined to be 'Slice 1'>'Slice 2'>'Slice 0'. Accordingly, 'Slice 1' has the highest priority because it has been determined to have unused resources that are being borrowed by 'Slice 0' (in 'Pool 0' and 'Pool 1') and by 'Slice 2' (in 'Pool 1'). The relative priority of 'Slice 2' and 'Slice 0', in this example scenario, is unimportant since 'Slice 0' is blocked from scheduling anyway.

The resource allocation calculations in case of the resource allocation scenario of FIG. 6 are summarised in Table 2 below.

TABLE 2

| | | Slice 0 | Slice 1 | Slice 2 |
|---|---|---|---|---|
| $t_{g,j}^{exp}$ | | 0.4 | 0.2 | 0.4 |
| $t_{m,g,j}^{pool}$ Pool 0 | | 0.2 | 0.2 | 0 |
| Pool 1 | | 0.1875 | 0 | 0.3125 |
| Pool 2 | | 0 | 0 | 0.0875 |
| $\sum_{m=0}^{M-1} t_{m,g,j}^{pool}$ | | 0.3875 | 0.2 | 0.4 |
| $t_{g,j}^{exp} > \sum_{m=0}^{M-1} t_{m,g,j}^{pool}$ | | Yes | No | No |

Procedure A given in steps (a)-(h) above describes a possible realisation of the generalised slice scheduler which implements the multiple-pool sharing scheme. However, it will be appreciated that the following modification of this procedure is applicable to any set of sharing rules (not only the multiple-pool scheme). This modified procedure (referred to as Procedure B) is performed at the start of each sub-frame, i.e. before conventional MAC scheduling takes place, in order to determine: i) the scheduling priority order of the slices in the current sub-frame, and ii) which slices (if any) should be blocked from scheduling in the current sub-frame. For sake of simplicity, the sub-frame index 'j' has been omitted from the following description.

Inputs:
  All fixed parameters of the sharing scheme (e.g. number of slices, their respective sharing ratios, etc.)
  Current measured resource usage of each slice 'g', $t_g^{exp}$ (calculated as explained above)

Outputs:
  Resource share of each slice ('g') $t_g^{share}$
  List of slices in decreasing order of MAC scheduler priority Procedure B:
  1. Initialise the resource share of each slice (i.e. for each value of 'g') $t_g^{share}$ to the resource guaranteed to that slice in a (hypothetical) fully congested case (i.e. the resources that slice g would receive if every slice had maximum traffic load). Initialise an empty priority list (as explained above).
  2. For each slice g calculate the corresponding slice weight, i.e.

$$w_g = \frac{t_g^{share}}{t_g^{exp}}$$

3. If $w_g \leq 1$ for all g, then go to step (9), else go to step (4)
4. Find the slice i with the highest value of $w_g$ (the highest weight), i.e.

$$i = \arg\max_g w_g$$

5. Append slice i to the priority list. If all slices have now been added to the priority list then go to step (7).
6. Calculate the unused resource of slice i, i.e. $t_i^{share} - t_i^{exp}$, redistribute it between the other slices which have not already been added to the priority list and increase the $t_g^{share}$ values (i.e. the maximum amount a particular remaining slice 'g' is allowed to use) of these other slices accordingly. The amount of redistributed resource that each slice receives depends on the specific sharing rules that are used.
7. Set the final resource usage of slice i to its actual resource usage, i.e. $t_i^{share} = t_i^{exp}$. The result of this assignment is that $w_i$ will become 1 when it is next calculated in step 2.
8. Go to step (2)
9. Add any remaining slices to the priority list in order of decreasing value of $w_g$, and stop.

This procedure ensures that $t_g^{share} \leq t_g^{exp}$ (or equivalently $w_g \leq 1$) for every slice g. It can also be determined that any slice that uses more resources than its calculated respective share (i.e. for which $w_g < 1$) is using more than its maximum amount of resources under the applied sharing rules and therefore it is blocked from scheduling in the current sub-frame.

It can be shown that if the sharing rules of the original NVS algorithm are applied in step (6) of this procedure then the priority order returned by the procedure will be the order of decreasing NVS weights, and the procedure will terminate with $t_g^{share} = t_g^{exp}$ for all slices (so no slices are blocked). Thus this procedure includes the original NVS algorithm as a special case.

In fact this procedure can also be used to calculate the share of each slice given the traffic load of each slice. In this case we simply invoke the procedure with $t_g^{exp} = t_g^{req}$, where $t_g^{req}$ represents the 'requested' resource for slice g, i.e. the amount of resource that slice g needs in order to serve its current traffic load (this would be equal to the total cell resources if slice g had maximum traffic load). The returned values $t_g^{share}$ then represent how much resource each slice would actually receive according to the sharing rules (which is always either equal to or less than the requested amount).

This modified procedure may also be applied to the multiple-pool case, as illustrated below by re-working the example shown previously. The respective resource usages $t_{g,j}^{exp}$ observed in a particular sub-frame are assumed to be 0.4, 0.2, and 0.4 for 'Slice 0', 'Slice 1', and 'Slice 2' respectively. The first step of the modified procedure is illustrated in Table 3 below:

TABLE 3

|  | Slice 0 | Slice 1 | Slice 2 |
|---|---|---|---|
| $t_{g,j}^{exp}$ | 0.4 | 0.2 | 0.4 |
| $t_g^{share}$ | 0.25 | 0.4 | 0.35 |
| $w_g$ | 0.625 | 2.0 | 0.875 |

'Slice 1' has the highest weight, $w_g$, so it is added to the priority list first. The unused resource of 'Slice 1' is 0.4−0.2=0.2. As previously, it is assumed that the pools are filled in increasing order of pool number. 'Slice 1' has a reservation of 0.3 in 'Pool 0', so the 0.2 unused resources include the remaining 0.1 in 'Pool 0' and an additional 0.1 in 'Pool 1'. The 0.1 in 'Pool 0' is added to $t_g^{share}$ of 'Slice 0', which is also allowed to use that resource pool. The 0.1 in 'Pool 1' is split between the operator slices that are allowed to use that pool, i.e. 'Slice 0' and 'Slice 2' in the ratio 0.3:0.5. (To work out how redistribute unused resource we still need to keep track of how much each slice is using in each pool, so a computation similar to the one previously presented in steps (a)-(h) will still be required).

Table 4 illustrates the modified procedure after redistributing the unused resource of 'Slice 1':

TABLE 4

|  | Slice 0 | Slice 1 | Slice 2 |
|---|---|---|---|
| $t_{g,j}^{exp}$ | 0.4 | 0.2 | 0.4 |
| $t_g^{share}$ | 0.3875 | 0.2 | 0.4125 |
| $w_g$ | 0.9688 | 1.0 | 1.0312 |

Now 'Slice 2' has the highest weight, $w_g$, so it is added to the priority list next. The unused resource of 'Slice 2' is 0.4125−0.4=0.0125. However this unused resource all lies in 'Pool 2', which is not shared with any other slice, so according to the sharing rules it cannot be redistributed to any other slice. The next step of the modified procedure is shown in Table 5:

TABLE 5

|  | Slice 0 | Slice 1 | Slice 2 |
|---|---|---|---|
| $t_{g,j}^{exp}$ | 0.4 | 0.2 | 0.4 |
| $t_g^{share}$ | 0.3875 | 0.2 | 0.4 |
| $w_g$ | 0.9688 | 1.0 | 1.0 |

Now we have $w_g \leq 1$ for all slices so the only remaining slice (ie. 'Slice 0') is added to the priority list, and the procedure terminates. However, since 'Slice 0' satisfies the condition $w_g \leq 1$, it is blocked from scheduling in this sub-frame.

Operation—Hierarchical Slice Scheduler

According to a variation on the above approach, the pool processor 65 applies a separate instance of the slice scheduler 66 for each resource pool as follows.

Similarly to the previous examples, $t_{m,g,j}^{exp}$ is the estimated resource measurement of slice 'g' in resource pool 'm' (as opposed to all resource pools) at the start of sub-frame 'j', and $w_{m,g,j}$ is the corresponding value of a weighting associated with slice 'g', defined as follows:

$$w_{m,g,j} = \frac{t_{m,g}^{rsv}}{t_{m,g,j}^{exp}}$$

In each sub-frame, the pool processor 65 selects one pool. The slice priorities for scheduling (of all resources available in that sub-frame) are set based on the slice weights $W_{m,g,j}$ in the selected pool. In addition, any slices which are not allowed to use the selected pool are excluded from scheduling altogether.

If $m_j$ is the resource pool selected in sub-frame 'j', the measurements $t_{m,g,j}^{exp}$ are updated as follows in every sub-frame:

if $m = m_{j-1}$, then $t_{m,g,j}^{exp} = (1-\beta)t_{m,g,j-1}^{exp} + \beta \frac{N_{g,j-1}}{K}$;

otherwise $t_{m,g,j}^{exp} = (1-\beta)t_{m,g,j-1}^{exp}$.

In order to determine which pool is selected in each sub-frame, the pool processor 65 uses an additional instance of the slice scheduler (hence the term 'hierarchical slice scheduler). In this 'top-level' slice scheduler, each resource pool 'm' may be attributed a pool weight in sub-frame 'j', $\omega_{m,j}$, which is calculated as follows:

$\omega_{m,j} = \frac{P_m}{\tau_{m,j}^{exp}}$ where $P_m$ is the size of the resource pool 'm' and the measurements $\tau_{m,j}^{exp}$ are updated, for every sub-frame, as follows:

if $m=m_{j-1}$, then $\tau_{m,j}^{exp}=(1-\beta)\tau_{m,j-1}^{exp}+\beta$;

otherwise $\tau_{m,j}^{exp}=(1-\beta)\tau_{m,j-1}^{exp}$

In each sub-frame 'j', the pool processor 65 selects the pool 'm' with the highest value of $\omega_{m,j}$, i.e. $m_j = \arg\max_m \omega_{m,j}$.

Figure 7:
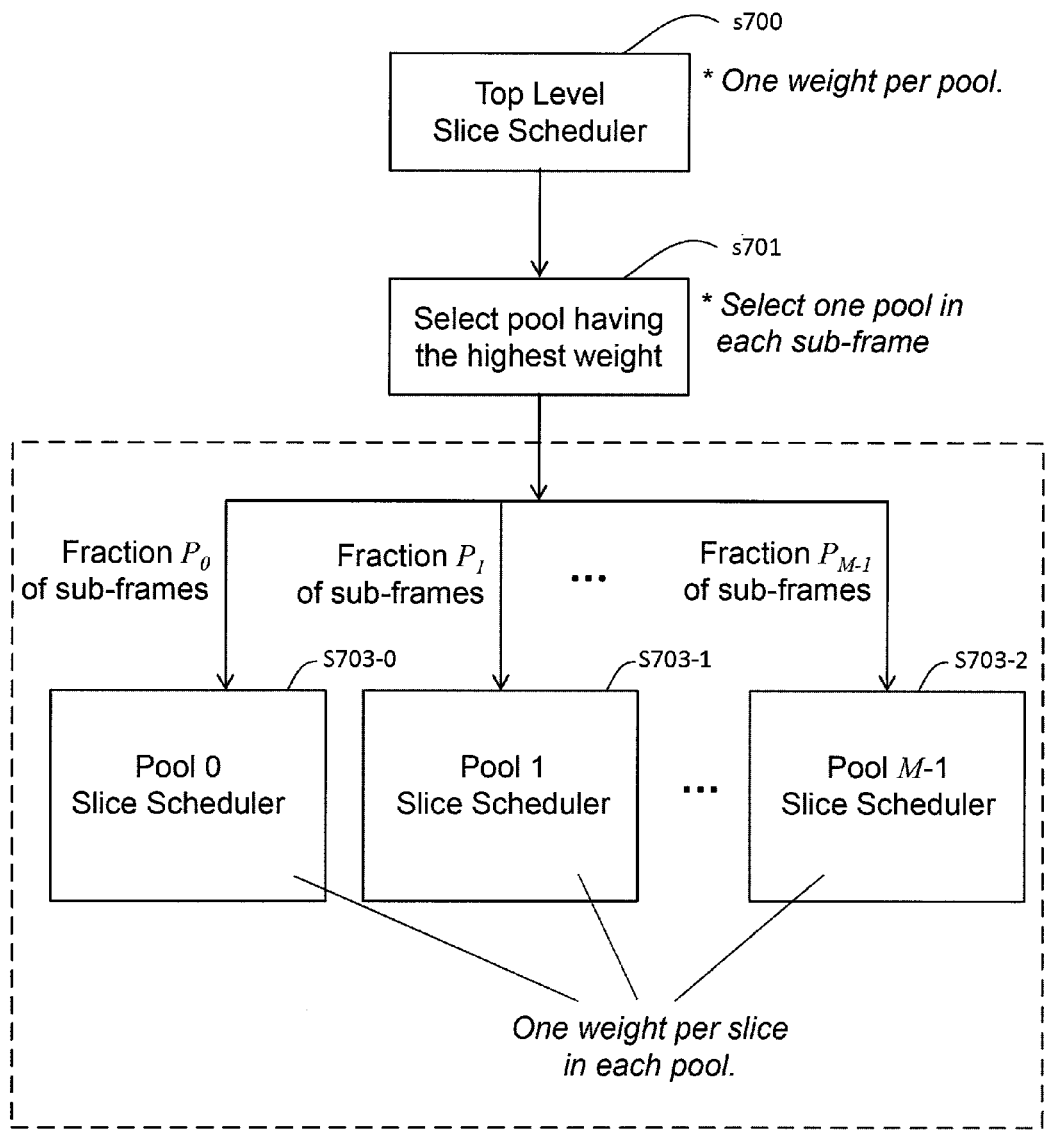
FIG. 7 is an exemplary flowchart illustrating a slice scheduling method performed by a shared base station suitable for use in the telecommunications network of FIG. 1.

The steps of the hierarchical slice scheduling method are described in more detail with reference to FIG. 7, which is an exemplary flowchart illustrating a slice scheduling method performed by a shared base station suitable for use in the telecommunications network of FIG. 1.

The method begins at step s700, in which the pool processor 65 of the shared base station 5 attributes each resource pool 'm' a pool weight for determining scheduling priorities in the current sub-frame 'j'. Thereafter, as shown in step S701, the pool processor 65 selects the resource pool having the highest weight. The selected resource pool will determine the scheduling rules to be applied in the given sub-frame 'j'.

In step S703, the pool processor 65 performs scheduling operations (e.g. by using its slice scheduler module 66) according to the scheduling rules applicable for the selected resource pool, e.g. by attributing a weight to each operator slice and allocating PRBs to communications belonging to each slice according to their respective weights. Therefore, if it is found in step S701 that 'Pool 0' has the highest weight, scheduling of the whole sub-frame 'j' will be carried out based on the rules defined for the resource pool denoted 'Pool 0' (i.e. as shown in step s703-0) even if that resource pool is accessible by only some of the network operators.

Similarly, if the pool processor 65 finds that 'Pool 1' has the highest weight in the given sub-frame 'j', it will perform scheduling according to the rules defined by that resource pool (i.e. as shown in step s703-1).

However, on average, each one of the resource pools will be given an opportunity that corresponds to its size compared to the sizes of other resource pools, thereby resulting in a scheduling method that, on average, also follows the respective proportions of shares of the operator slices.

In summary, the hierarchical slice scheduling approach beneficially ensures that each resource pool receives a fraction $P_m$ of the sub-frames on average. However, sharing of sub-frames between resource pools could alternatively be achieved by other means, for example, using a round-robin algorithm to select the resource pool for scheduling in each sub-frame.

Operation—Two-Stage Scheduler for Latency Reduction

Although the above described scheduler algorithms ensure that each slice receives the correct share of resources on average (over the memory period of the exponential averaging used for the resource usage measurement), in some cases however, over a relatively short period of a few sub-frames only, an operator's slice may have to wait for several sub-frames before being granted resources, especially if the slice has a small proportion of the total resources of the shared base station 5. For delay-sensitive services, it is advantageous to reduce or eliminate such delays. Such delay-sensitive services typically comprise 'real-time' services (sometimes referred to as Guaranteed Bit Rate (GBR) services), for example: voice calls, multimedia telephony, mobile TV, real-time video (live or buffered video stream), real-time gaming, and the like.

Figure 8:
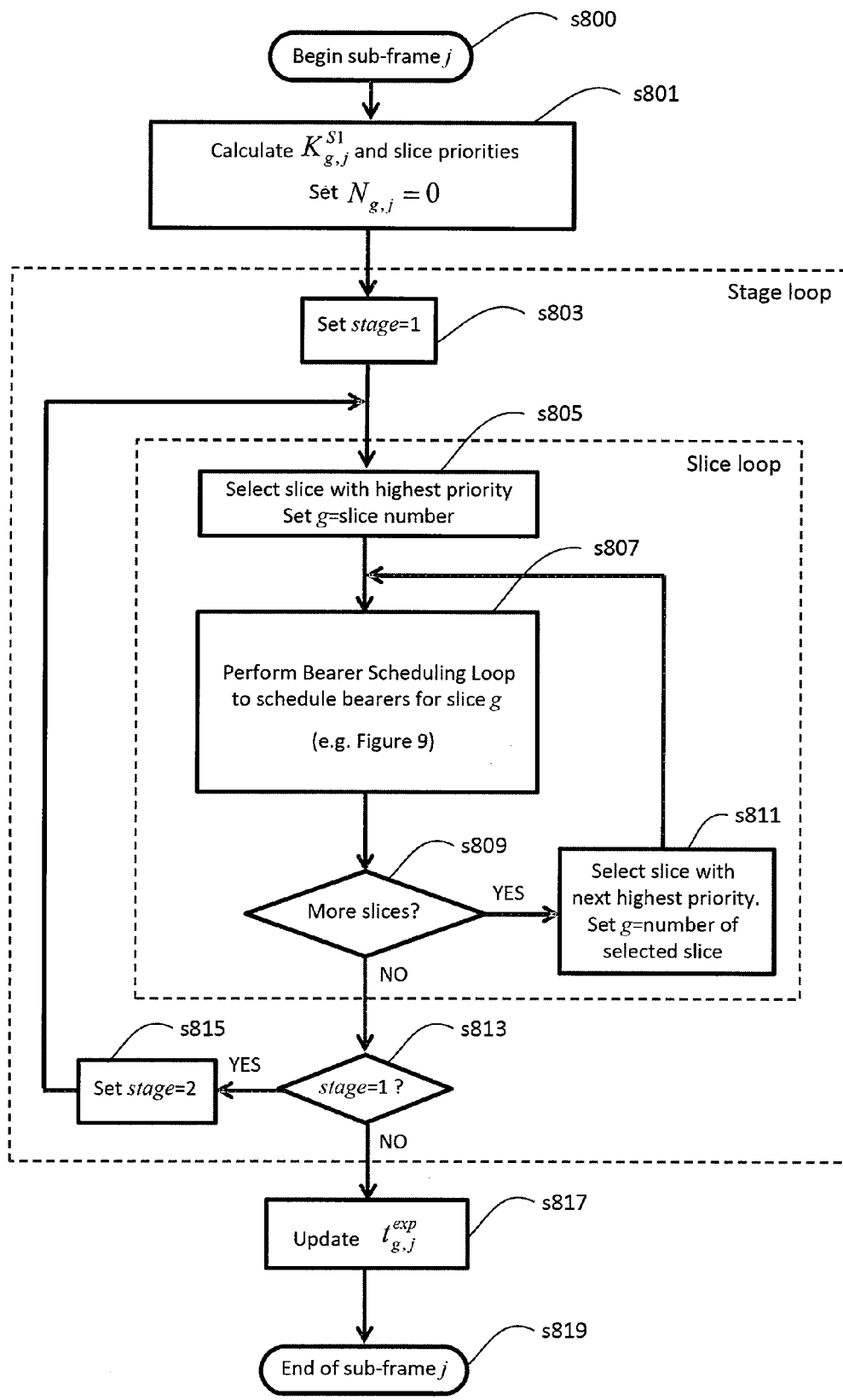
FIG. 8 is an exemplary flowchart illustrating an alternative slice scheduling method performed by a shared base station suitable for use in the telecommunications network of FIG. 1.

In the following, with reference to FIGS. 8 and 9, another slice scheduler algorithm is described using which the shared base station 5 can guarantee that each slice receives a predetermined minimum amount of resources in every sub-frame. This approach ensures that each slice is able to serve at least a certain amount of delay-sensitive traffic with low latency.

If $t_g^{inst}$ is the 'instantaneous' resource guarantee that the shared base station 5 needs to provide to slice 'g', expressed as a fraction of the total cell resources, then the shared base station 5 operates to ensure that slice 'g' is guaranteed at least $t_g^{inst}$ resources in every sub-frame, even if that slice would not be scheduled otherwise (e.g. because it is blocked in the current scheduling round or it does not belong to a pool that is being scheduled in the current scheduling round). It is assumed that $t_g^{inst} \leq t_g^{rsv}$.

The above objective can be achieved by performing the scheduling in each sub-frame in two stages, as follows.

1. In stage 1 (steps s803 to s811 of FIG. 8), the slice scheduler 66 proceeds according to the normal slice scheduling algorithm (ignoring any selective blocking invoked and/or pool weight dependent pool selection), i.e. by considering slices in decreasing order of slice priority (such as in decreasing order of weight $w_{g,j}$ as explained above) and performing bearer scheduling for each slice in step 807 in accordance with the process illustrated in FIG. 9. However, as soon as a slice has been allocated $t_g^{inst}$ resources in total (step s807 and the exemplary flowchart of FIG. 9), it is prevented from receiving further resources in stage 1, and the scheduler proceeds to the next highest priority slice (step s811). Stage 1 continues until all slices have received their respective $t_g^{inst}$ resources or there are no candidate bearers remaining (step s809: 'NO').

2. In stage 2 (steps s815 and then starting again from the highest priority slice at step s805), any resources that remain after stage 1 are assigned using the normal slice scheduler algorithm (steps s807 to s811). However, in stage 2, any selective blocking invoked and/or pool weight dependent pool selection may also be taken into account, if the shared base station supports such features.

In step s817, all resources that are assigned in both stage 1 and stage 2 are included in the update of the resource usage measurement, $t_{g,j}^{exp}$, for each operator slice 'g', before the slice scheduler 65 terminates processing of the current sub-frame 'j' (at step s819). It will be appreciated that since $t_g^{inst} \leq t_g^{rsv}$, a slice cannot gain more than its minimum guaranteed resource share in stage 1, so the basic sharing behaviour of the slice scheduler is not affected. This also means that the minimum guaranteed resource share is essentially the maximum amount of resources that can be allocated in stage 1.

Figure 9:
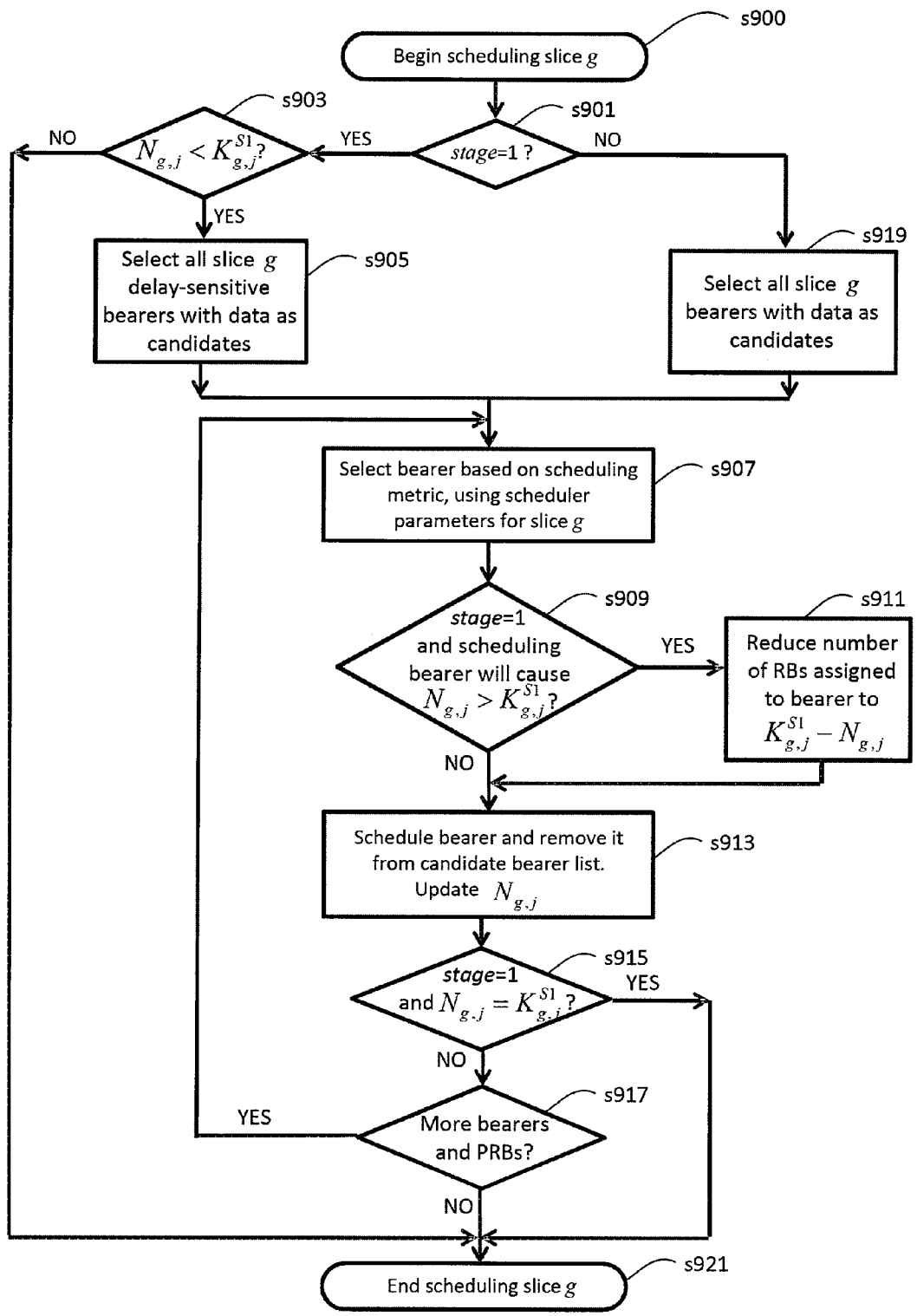
FIG. 9 is an exemplary flowchart illustrating another alternative slice scheduling method performed by a shared base station suitable for use in the telecommunications network of FIG. 1.

Referring to FIG. 9, the bearer scheduling for each slice depends on whether stage 1 or stage 2 processing is required. Specifically, in FIG. 9, during stage 1 (S901: YES), when the number of resource blocks allocated to a slice 'g' in sub-frame 'j' ($N_{g,j}$) is less than the maximum stage 1 allocations (which can be defined e.g. as a predetermined number of resource blocks) for that slice in that sub frame ($K_{g,j}^{S1}$) (S903: YES) then the scheduler selects all slice 'g' delay sensitive bearers with data to communicate to be candidates for resource allocation (S905). It will be appreciated that although $K_{g,j}^{S1}$ is the maximum stage 1 resource allocation that an operator slice 'g' can receive in sub-frame 'j' it is equivalent to the minimum instantaneous resource allocation that operator slice 'g' is guaranteed to receive in each sub-frame. Since the purpose of this feature is to improve latency for delay-sensitive services, typically only bearers belonging to delay-sensitive services would be allowed to be allocated resources in stage 1. Contrastingly, during stage 2 (S901: NO), the scheduler selects all slice 'g' bearers (regardless of any delay sensitivity) with data to communicate to be candidates for resource allocation (S919).

In step S907 a candidate bearer from S905 or S919 is selected based on the normal scheduling metric using scheduler parameters for the slice being processed. Such scheduling metric may typically include a so-called proportional fair (PF) metric, possibly with other terms included, e.g. to prioritise traffic based on Quality Class Indicator (QCI) of the bearer. The weighting used for these additional terms may be slice-specific. The proportional fair metric includes a fairness parameter, which may also be slice-specific.

For stage 1 processing, if scheduling the selected candidate bearer will cause the number of resource blocks allocated to slice 'g' in sub-frame 'f' ($N_{g,j}$) to exceed the maximum stage 1 allocations (minimum guaranteed allocations) for that slice in that sub-frame ($K_{g,j}^{S1}$) (S909: YES) then the number of resource blocks assigned to the bearer is reduced to $N_{g,j} - K_{g,j}^{S1}$ at S911. Otherwise (S909: NO) the bearer is scheduled and removed from the candidate bearer list and the parameter $N_{g,j}$ recording the number of resource blocks assigned to the bearer is updated.

Then, for stage 1 processing, the number of resource blocks allocated to slice 'g' in sub-frame 'j' ($N_{g,j}$) equals the minimum stage 1 allocations for that slice in that sub-frame ($K_{g,j}^{S1}$) (S915: YES) then the scheduling process ends and the procedure returns to that of FIG. 8 (S809). Otherwise (S915: NO) the process is repeated from S907 (S917: YES) for each further bearer, as long as allocatable physical resource blocks remain. If no bearers or allocatable physical resource blocks remain (S917: NO) then the scheduling process ends and the procedure returns to that of FIG. 8 (S809).

The advantage of considering slice priorities in stage 1 is that it allows a customised scheduler algorithm (or scheduler algorithm parameters) to be used for each slice. If this is not required, optionally slice priorities may be disregarded in stage 1 and bearers may be selected without regard to slice priority, removing each slice from further scheduling as soon as it has received $t_g^{inst}$ resources.

However, in some cases, it may not be possible to allocate exactly $t_g^{inst}$ resources to a slice 'g' in stage 1, because $t_g^{inst}$ for that slice 'g' may not correspond to an integer number of PRBs. Therefore, the slice scheduler 65 may apply the following method, e.g. whilst performing the steps illustrated in the exemplary flowchart of FIG. 9.

It is appreciated that $K_{g,j}^{S1}$ is the maximum number of PRBs that the Stage 1 scheduler is allowed to assign to slice 'g' in sub-frame 'j'. (Note that in the following it is assumed that the unit of scheduling allocation is one PRB. However the method can be easily adapted for units of Resource Block Groups (RBGs) for the downlink scheduler case).

The slice scheduler 65 needs to set $K_{g,j}^{S1} = K \cdot t_g^{inst}$, i.e. the resources guaranteed in stage 1 for operator slice 'g' in sub-frame 'j', wherein K represents the total number of PRBs available in the system bandwidth and $t_g^{inst}$ the 'instantaneous' resource guarantee that the shared base station 5 needs to provide to slice 'g' in each sub-frame. However it is possible that $K \cdot t_g^{inst}$ is not an integer value. In this case one simple option is to set $K_{g,j}^{S1} = \lfloor K \cdot t_g^{inst} \rfloor$, i.e. the largest integer not greater than $K \cdot t_g^{inst}$, but this means that the given slice, in some sub-frames, may receive a fraction less than the expected (guaranteed) amount of resources per sub-frame. Therefore, it is suggested to assign at least $\lfloor K \cdot t_g^{inst} \rfloor$ amount of resources, but to assign sometimes more resources, such that the operator slice receives exactly $K \cdot t_g^{inst}$ on average. The slice scheduler 66 also ensures that in stage 1, in any sub-frame, the number of PRBs assigned to operator slices does not exceed the sum of all 'instantaneous' per sub-frame resource guarantees (for all slices), $K_{total}^{S1}$, where $$K_{total}^{S1} = \left\lceil K \sum_g t_g^{inst} \right\rceil.$$

This can be achieved by the following method.

At the start of each sub-frame, the slice scheduler 65 calculates $K_{g,j}^{S1}$ using the procedure shown below, where $d_{g,j}$ is a real-valued (possibly negative) 'credit' value for operator slice 'g'. $d_{g,j}$ is initialised to 0 at j=0.
1. Initialise: $K' = K_{total}^{S1}$ and $K_{g,j}^{S1} = 0$ for all slices.
2. For each slice 'g', do the following:

$\kappa_g \leftarrow \lfloor K \cdot t_g^{inst} \rfloor;$ $K_{g,j}^{S1} \leftarrow \kappa_g;$ $K' \leftarrow K' - \kappa_g;$ and $d_{g,j} \leftarrow d_{g,j-1} + K \cdot t_g^{inst} - \kappa_g.$ 3. Set g' to the index of the slice with the highest (i.e. most positive) value of $d_{g,j}$:

$$g' = \arg\max_g d_{g,j}$$

4. If K'>0 and $d_{g',j}>0$ then do the following, else stop:

$K_{g',j}^{S1} \leftarrow K_{g',j}^{S1}+1;$ $K' \leftarrow K'-1;$ and $d_{g',j} \leftarrow d_{g',j}-1.$ 5. Set g' to the index of the slice with the next highest value of $d_{g,j}$, and go to step 4.

This algorithm has the following properties:

If $K \cdot t_g^{inst}$ is an integer value then $K_{g,j}^{S1}=K \cdot t_g^{inst}$ exactly in every sub-frame;

If $K \cdot t_g^{inst}$ is not an integer value, then either $K_{g,j}^{S1}=\lfloor K \cdot t_g^{inst} \rfloor$ or $K_{g,j}^{S1}=\lfloor K \cdot t_g^{inst} \rfloor+1$, and the average of $K_{g,j}^{S1}$ over many sub-frames is $K \cdot t_g^{inst}$; and The total number of RBs in one sub-frame is never more than $K_{total}^{S1}$, i.e.

$$\sum_g K_{g,j}^{S1} \leq K_{total}^{S1}.$$

An example of a series of resource allocations is shown in Table 6 for the case of three operator slices with $t_g^{inst}=\{0.1, 0.165, 0.035\}$ and K=50, for the duration of eight consecutive sub-frames ('Sub-frame 0' to 'Sub-frame 7').

TABLE 6 per sub-frame resource guarantees ($K_{g,j}^{S1}$)

| Sub-frame, j | $K_{g,j}^{S1}$ | | | $d_{g,j}$ (at end of sub-frame) | | |
|---|---|---|---|---|---|---|
| | Slice 0 | Slice 1 | Slice 2 | Slice 0 | Slice 1 | Slice 2 |
| 0 | 5 | 8 | 2 | 0.0 | 0.25 | −0.25 |
| 1 | 5 | 8 | 2 | 0.0 | 0.5 | −0.5 |
| 2 | 5 | 9 | 1 | 0.0 | −0.25 | 0.25 |
| 3 | 5 | 8 | 2 | 0.0 | 0.0 | 0.0 |
| 4 | 5 | 8 | 2 | 0.0 | 0.25 | −0.25 |
| 5 | 5 | 8 | 2 | 0.0 | 0.5 | −0.5 |
| 6 | 5 | 9 | 1 | 0.0 | −0.25 | 0.25 |
| 7 | 5 | 8 | 2 | 0.0 | 0.0 | 0.0 |
| etc. | | | | | | |
| Average | 5 | 8.25 | 1.75 | | | |

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

While the above described embodiments have been limited to three network operators sharing capacity at a base station or in the core network, it will be appreciated that two, four, five, or more network operators may share parts of the network, and that the described embodiments are generally applicable to networks shared by at least two operators.

In the above embodiments, the resource pools are described as comprising sets of virtual resources that can be allocated to the network operators sharing the respective resource pools. However, it will be appreciated that resource pool may also correspond to physical resources, e.g. base station cells, frequency bands, and the like.

The multiple-pool scheme is used only as an example to show the benefit of the proposed procedures. However the proposed procedures are not limited to the multiple-pool scheme but may be implemented by a shared base station providing a single resource pool as well. Furthermore, Procedure B may be used to implement any arbitrary set of sharing rules. The only requirement for applying Procedure B is that it must be possible to compute (i) how much each slice gets in the fully congested case, and (ii) how unused resources belonging to one slice should be shared between the remaining slices. Thus there is no need to update the pool processor of the shared base station having only one resource pool (e.g. when it is first deployed) to support a second (or further) resource pool later in use. Alternatively, a shared base station providing multiple resource pools can be conveniently re-configured to provide only one resource pool for the network operators sharing the base station (e.g. when a particular network operator no longer uses the resources of this shared base station, it may be more appropriate to provide a single resource pool for the remaining sharing network operators).

In the above description of steps (a)-(h) of the exemplary algorithm it is assumed that each slice fills its available resources in increasing order of pool number. However, it will be appreciated that the algorithm may be adapted to handle alternative assumptions, for example:

Each slice tries to distribute its resources 'evenly' over all pools (i.e. in proportion to the respective pool sizes, $P_m$), or Each slice distributes its resources over all available pools in such a way as to maximise the overall resource utilisation for all slices.

In the above description of hierarchical slice scheduler, the measurements $t_{m,g,j}^{exp}$ are updated as: if $m=m_{j-1}$, then $$t_{m,g,j}^{exp} = (1-\beta)t_{m,g,j-1}^{exp} + \beta \frac{N_{g,j-1}}{K};$$

otherwise $$t_{m,g,j}^{exp} = (1-\beta)t_{m,g,j-1}^{exp}.$$

It will be appreciated however, that it is possible to set $t_{m,g,j}^{exp}=t_{m,g,j-1}^{exp}$ if $m \neq m_{j-1}$, which may result in slightly more accurate resource allocations. In this case, $t_{m,g,j}^{exp}$ represents a fraction of the pool resources rather than a fraction of the total cell resources, but it can still be converted to a fraction of the cell resources if required by multiplying by $P_m$).

It will be appreciated that the method illustrated in FIGS. 8 and 9 may be modified as follows: no restriction is placed on the amount of resources that can be allocated to a slice in Stage 1, but the slice scheduler only allows delay-sensitive services to be scheduled in stage 1 (s905), and only allows a slice to be given resources in Stage 1 if the following condition is satisfied:

$t_{g,j}^{expDS} \leq t_g^{rsv}$

Here $t_{g,j}^{expDS}$ is a measurement of the resources assigned to all delay-sensitive bearers belonging to slice 'g' and it can be generated in an analogous way to $t_{g,j}^{exp}$:

$$t_{g,j}^{expDS} = (1-\beta)t_{g,j-1}^{expDS} + \beta \frac{N_{g,j-1}^{DS}}{K}$$

where β is, effectively, a forgetting factor parameter in the range 0 to 1 (where a value of 1 means that resource usage in previous sub-frames is ignored), $N_{g,j-1}^{DS}$ is the total number of resources (e.g. PRBs) in the system bandwidth assigned in a sub-frame immediately preceding sub-frame 'j' to all delay-sensitive bearers belonging to slice g. It should be clear that $t_{g,j}^{expDS} \leq t_{g,j}^{exp}$. By allowing slice 'g' to be scheduled in Stage 1 only if the condition $t_{g,j}^{expDS} \leq t_g^{rsv}$ is met, the slices scheduler ensures that slice 'g' cannot obtain more than its minimum reservation in stage 1, so the sharing behaviour of NVS is still preserved. Note that this variant of the method does not provide a guarantee that resources will be available in every sub-frame. However it has a lower complexity, and can still improve the performance of delay-sensitive services.

In the above embodiments, a telecommunications system operating according to the LTE standards was described. However, as those skilled in the art will appreciate, the techniques described in the present application can be employed in communications systems operating according to other standards, in particular any Orthogonal Frequency-Division Multiplexing (OFDM)-based system, such as the Worldwide Interoperability for Microwave Access (Wi-MAX) standard.

In the above embodiment, a mobile telephone based telecommunications system was described. As those skilled in the art will appreciate, the techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, and the like.

In the above embodiments, a number of software modules were described. As those skilled will appreciate, the software modules may be provided in compiled or un-compiled form and may be supplied to the base station as a signal over a computer network, or on a recording medium. Further, the functionality performed by part or all of this software may be performed using one or more dedicated hardware circuits. However, the use of software modules is preferred as it facilitates the updating of the base station in order to update its functionality. Similarly, although the above embodiments employed transceiver circuitry, at least some of the functionality of the transceiver circuitry can be performed by software.

Various other modifications will be apparent to those skilled in the art and will not be described in further detail here.

This application is based upon and claims the benefit of priority from United Kingdom patent application No. 1306539.6, filed on Apr. 10, 2013, the disclosure of which is incorporated herein in its entirety by reference.

The invention claimed is:

1. A base station for sharing a plurality of resources of a communication bandwidth between a plurality of network operators, the base station comprising:
   at least one non-transitory computer readable medium;
   at least one processor configured to:
   define:
   (a) a first proportion of said resources of said communication bandwidth, said first proportion representing a first virtual pool of resources;
   (b) a second proportion of said resources of said communication bandwidth, said second proportion representing a second virtual pool of resources;
   (c) for said first virtual resource pool:
   a respective first pool proportion, for each of the plurality of network operators, representing a reserved proportion of the resources of the first virtual pool to be allocated for a set of one or more communication bearers for the respective network operator; and
   (d) for said second virtual resource pool:
   a respective second pool proportion, for each of the plurality of network operators, representing a reserved proportion of the resources of the second virtual pool to be allocated for the set of one or more communication bearers for the respective network operator;
   prioritize allocation of resources to the respective set of one or more communication bearers for each of the plurality of network operators in dependence on an analysis based on the pool proportion of the respective network operator in at least one of said first and second virtual resource pools; and
   allocate resources, in a current scheduling round, to the communication bearers of each of the plurality of network operators in dependence on a scheduling priority attributed to the communication bearers of the respective network operator.

2. The base station according to claim 1, wherein the at least one processor is further configured to exclude the set of one or more communication bearers for at least one network operator, among the plurality of network operators, from resource allocation, in the current scheduling round, in dependence on said analysis.

3. The base station according to claim 2, wherein the at least one processor is further configured to exclude the respective set of one or more communication bearers for said at least one network operator from resource allocation by causing the allocating means to ignore the set of one or more communication bearers for the at least one network operator during scheduling.

4. The base station according to claim 2, wherein the at least one processor is further configured to exclude the respective set of one or more communication bearers for said at least one network operator from resource allocation by omitting said set of one or more communication bearers for the at least one network operator from a prioritized list of sets of communication bearers.

5. The base station according to claim 2, wherein the at least one processor is further configured to exclude the respective set of one or more communication bearers for said at least one network operator from resource allocation by attributing a minimum priority to said set of one or more communication bearers for the at least one network operator.

6. The base station according to claim 2, wherein the at least one processor is further configured to exclude the set of one or more communication bearers for said at least one network operator from resource allocation when said analysis indicates that a measure of resource usage by the set of one or more communication bearers exceeds a sum of all pool proportions for the respective network operator across all virtual resource pools.

7. The base station according to claim 6, wherein the at least one processor is further configured to exclude the set of one or more communication bearers for said at least one network operator from resource allocation when a condition represented by the following inequality is met:

$$t_{g,j}^{exp} > \sum_{m=0}^{M-1} t_{m,g,j}^{pool}$$

where $t_{g,j}^{exp}$ is the measure of resource usage by a set of one or more communication bearers for a network operator denoted 'g' as measured for sub-frame denoted 'j'; M is the number of virtual resource pools; $t_{m,g,j}^{pool}$ is the proportion of resources an operator proportion for a set of one or more communication bearers for a network operator denoted 'g' obtains in a virtual resource pool denoted 'm' in a sub-frame denoted 'j'.

8. The base station according to claim 7, wherein the proportion of the resources a particular network operator obtains, $t_{m,g,j}^{pool}$, is represented by the following formula:

$$Q \frac{f_g t_{m,g}^{rsv}}{\sum_k f_k t_{m,k}^{rsv}}$$

where $t_{m,g}^{rsv}$ is the size of a pool proportion, in the range of 0 to 1, for a set of one or more communication bearers for a network operator denoted 'g' in a resource pool denoted 'm'; $f_g$ is a Boolean operator which is set to 1, for a virtual resource pool, for the set of one or more communication bearers for a network operator denoted 'g' if the particular network operator is allowed to use the particular pool, and set to 0, for a virtual resource pool, for the set of one or more communication bearers for a network operator denoted 'g' if the particular network operator is not allowed to use that particular pool; Q is a quantity of remaining resources that is distributable, in the t particular resource pool, amongst communication bearers of all network operators that are allowed to use the particular resource pool, and wherein when analyzing each virtual resource pool, Q is initially set to the size of the particular resource pool.

9. The base station according to claim 6, wherein said measure of resource usage represents resource usage over a predetermined number of sub-frames.

10. The base station according to claim 6, wherein said measure of resource usage represents resource usage by the set of one or more communication bearers over all resource pools.

11. A base station for sharing resources of a communication bandwidth between a plurality of network operators, the base station comprising:
at least one non-transitory computer readable medium;
at least one processor configured to:
define, for each of the plurality of network operators, a respective share of resources that would be allocated for a set of one or more communication bearers for the respective network operator if said communication bandwidth were in a congested state;
prioritize allocation of resources to the respective set of one or more communication bearers for each of the plurality of network operators in dependence on said defined respective share of resources for the respective network operator; and
allocate resources, in a current scheduling round, to the communication bearers of each of the plurality of network operators in dependence on a scheduling priority attributed to the communication bearers of the respective network operator.

12. The base station according to claim 11, wherein the at least one processor is further configured to determine, prior to said scheduling, a measure of an amount of resources that would remain unused if scheduling were based on said prioritization alone and for defining a distribution of said amount of resources that would remain unused, to the communication bearers of at least one other network operator, in dependence on said respective share of resources for the respective network operator.

13. The base station according to claim 11, wherein the at least one processor is further configured to exclude the set of one or more communication bearers for at least one network operator from resource allocation, in the current scheduling round, in dependence on said respective share of resources for the respective network operator.

14. The base station according to claim 11, wherein the at least one processor further configured to prioritize said allocation of resources in dependence on a respective weight determined for said set of one or more communication bearers of each of the plurality of network operators in said current scheduling round.

15. The base station according to claim 14, wherein said weight for a set of one or more communication bearers of a particular network operator is given by a ratio of the respective share of resources to a measured resource usage, for the set of communication bearers.

16. The base station according to claim 15, wherein the respective weights for each set of one or more communication bearers is represented by the following equation:

$$w_g = \frac{t_g^{share}}{t_g^{exp}}$$

where $w_g$ is the weight for set of one or more communication bearers of a network operator denoted 'g'; $t_g^{share}$ is the share of resources for the set of one or more communication bearers of the network operator denoted 'g'; and $t_g^{exp}$ is the measure of resource usage by the set of one or more communication bearers of the network operator denoted 'g'.

17. The base station according to claim 11, wherein said respective share of resources that would be allocated for a set of one or more communication bearers for each of the plurality of network operators if said communication bandwidth were in a congested state is dependent on i) a respective reserved proportion of the resources of the communication bandwidth for the set of one or more communication bearers for the respective network operator and ii) a measure of usage of the resources of the communication bandwidth for the set of one or more communication bearers for the respective network operator.

18. A base station for sharing resources of a communication bandwidth between a plurality of network operators, the base station comprising:
at least one non-transitory computer readable medium;
at least one processor configured to:
define a respective proportion, for each of the plurality of network operators, representing a reserved proportion of the resources of said communication bandwidth to be allocated for a set of one or more communication bearers for the respective network operator;
prioritize allocation of resources to the respective set of one or more communication bearers for each of the plurality of network operators in dependence on an analysis based on the proportion of the respective network operator, and exclude the set of one or more communication bearers for at least one network operator from resource allocation, in the current scheduling round, in dependence on said analysis; and
allocate resources, in a current scheduling round, to the communication bearers of each of the plurality of network operators in dependence on a scheduling priority attributed to the communication bearers of the respective network operator.

19. A base station for sharing resources of a communication bandwidth between a plurality of network operators, the base station comprising:
at least one non-transitory computer readable medium;
at least one processor configured to:
define:
(a) a first operator proportion representing a reserved proportion of the resources to be allocated for a first set of one or more communication bearers for a first network operator;
(b) a second operator proportion representing a reserved proportion of the resources to be allocated for a second set of one or more communication bearers for a second network operator;
prioritize allocation of resources to the respective set of one or more communication bearers for each of the plurality of network operators in dependence on an analysis based on the operator proportion of the respective network operator;
allocate resources, in a current scheduling round, to the respective communication bearers of each of the plurality of network operators in dependence on a scheduling priority attributed to the communication bearers of the respective network operator;
wherein said at least one processor is further configured to:
allocate, to each communication bearer of a first group of communication bearers a respective predetermined amount of resources, in a priority order based on the scheduling priority attributed to the network operator to which each communication bearer of said first group of communication bearers belongs; and
allocate, to each communication bearer of a second group of communication bearers, resources remaining after said allocation to each communication bearer of said first group of communication bearers, in a priority order based on the scheduling priority attributed to the network operator to which each communication bearer of said second group of communication bearers belongs.

20. A method performed by a base station for sharing resources of a communication bandwidth between a plurality of network operators, the method comprising:
defining:
(a) a first proportion of said resources of said communication bandwidth, said first proportion representing a first virtual pool of resources;
(b) a second proportion of said resources of said communication bandwidth, said second proportion representing a second virtual pool of resources;
(c) for said first virtual resource pool:
a respective first pool proportion, for each of the plurality of network operators, representing a reserved proportion of the resources of the first virtual pool to be allocated for a set of one or more communication bearers for the respective network operator; and
(d) for said second virtual resource pool:
a respective second pool proportion, for each of the plurality of network operators, representing a reserved proportion of the resources of the second virtual pool to be allocated for the set of one or more communication bearers for the respective network operator;
prioritizing allocation of resources to the respective set of one or more communication bearers for each network operator in dependence on an analysis based on the pool proportion of the respective network operator in at least one of said virtual resource pools; and
allocating resources, in a current scheduling round, to the communication bearers of each network operator in dependence on a scheduling priority attributed to the communication bearers of the respective network operator by the prioritizing operation.

21. A method performed by a base station for sharing resources of a communication bandwidth between a plurality of network operators, the method comprising:
defining, for each of the plurality of network operators, a respective share of resources that would be allocated for a set of one or more communication bearers for the respective network operator if said communication bandwidth were in a congested state;
prioritizing allocation of resources to the respective set of one or more communication bearers for each of the plurality of network operators in dependence on said defined respective share of resources for the respective network operator; and
allocating resources, in a current scheduling round, to the communication bearers of each of the plurality of network operators in dependence on a scheduling priority attributed to the communication bearers of the respective network operator by the prioritizing operation.

22. A method performed by a base station for sharing resources of a communication bandwidth between a plurality of network operators, the method comprising:
defining a respective proportion, for each of the plurality of network operators, representing a reserved proportion of the resources of said communication bandwidth to be allocated for a set of one or more communication bearers for the respective network operator;
prioritizing allocation of resources to the respective set of one or more communication bearers for each of the plurality of network operators in dependence on an analysis based on the proportion of the respective network operator, wherein said prioritizing excludes the set of one or more communication bearers for at least one network operator from resource allocation, in the current scheduling round, in dependence on said analysis; and
allocating resources, in a current scheduling round, to the communication bearers of each of the plurality of network operators in dependence on a scheduling priority attributed to the communication bearers of the respective network operator by the prioritizing.

23. A method performed by a base station for sharing resources of a communication bandwidth between a plurality of network operators, the method comprising:
defining:
(a) a first operator proportion representing a reserved proportion of the resources to be allocated for a first set of one or more communication bearers for a first network operator;
(b) a second operator proportion representing a reserved proportion of the resources to be allocated for a second set of one or more communication bearers for a second network operator;
prioritizing allocation of resources to the respective set of one or more communication bearers for each of the plurality of network operators in dependence on an analysis based on the operator proportion of the respective network operator;
allocating resources, in a current scheduling round, to the respective communication bearers of each of the plurality of network operators in dependence on a scheduling priority attributed to the communication bearers of the respective network operator by the prioritizing operation;

wherein said allocating operation further comprises:
- allocating, to each communication bearer of a first group of communication bearers a respective predetermined amount of resources, in a priority order based on the scheduling priority attributed to the network operator to which each communication bearer of said first group of communication bearers belongs; and
- allocating, to each communication bearer of a second group of communication bearers, resources remaining after said allocation to each communication bearer of said first group of communication bearers, in a priority order based on the scheduling priority attributed to the network operator to which each communication bearer of said second group of communication bearers belongs.

24. A non-transitory computer program product comprising computer implementable instructions for causing a programmable computer device to perform the method of claim 20.

* * * * *